(12) United States Patent
Ishibe

(10) Patent No.: US 8,493,643 B2
(45) Date of Patent: Jul. 23, 2013

(54) MULTI-BEAM LIGHT SCANNING APPARATUS AND IMAGE FORMING APPARATUS USING THE SAME

(75) Inventor: Yoshihiro Ishibe, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 368 days.

(21) Appl. No.: 12/880,689

(22) Filed: Sep. 13, 2010

(65) Prior Publication Data

US 2011/0063703 A1    Mar. 17, 2011

(30) Foreign Application Priority Data

Sep. 14, 2009  (JP) ................................. 2009-211550

(51) Int. Cl.
*G02B 26/08*    (2006.01)

(52) U.S. Cl.
USPC .................................... 359/216.1; 359/201.1

(58) Field of Classification Search
USPC .......... 359/197.1, 204.1–204.5, 216.1–221.1; 347/225, 232, 233, 241, 258, 259; 358/505, 358/474, 480, 481
See application file for complete search history.

(56) References Cited

U.S. PATENT DOCUMENTS

| | | | | |
|---|---|---|---|---|
| 6,987,594 B2 * | 1/2006 | Takayama | ................... | 359/207.1 |
| 8,085,456 B2 * | 12/2011 | Kimura | ....................... | 359/204.1 |
| 8,233,209 B2 * | 7/2012 | Miyatake et al. | ........... | 359/204.1 |
| 2005/0052525 A1 * | 3/2005 | Ishibe | ............................ | 347/235 |
| 2006/0203318 A1 * | 9/2006 | Yamawaki | ..................... | 359/216 |
| 2011/0115873 A1 * | 5/2011 | Shimomura | ................... | 347/224 |
| 2012/0177409 A1 * | 7/2012 | Arai et al. | ..................... | 399/177 |

FOREIGN PATENT DOCUMENTS

JP    2004-070108 A    3/2004

* cited by examiner

*Primary Examiner* — Jennifer L. Doak
(74) *Attorney, Agent, or Firm* — Rossi, Kimms & McDowell LLP

(57) ABSTRACT

A multi-beam light scanning apparatus includes incident optical systems each of which allows a light beam to enter a deflection surface of a rotational polygon mirror in a sub scanning section from above and below directions obliquely with respect to a surface perpendicular to a rotation axis of the rotational polygon mirror at a finite angle, and a light source unit which is disposed for each of the incident optical systems and has light emitting portions. A light emitting portion corresponding to printing of a head line in the sub scanning direction among the light emitting portions of the light source unit that are disposed obliquely in the upward direction, and a light emitting portion corresponding to the printing of the head line in the sub scanning direction, that are disposed obliquely in the downward direction are different from each other in the sub scanning direction.

21 Claims, 22 Drawing Sheets

MULTI-BEAM LIGHT SCANNING APPARATUS AND IMAGE FORMING APPARATUS USING THE SAME

BACKGROUND OF THE INVENTION

1. Field of the Invention

The present invention relates to a multi-beam light scanning apparatus and an image forming apparatus using the same, and is suitable for an image forming apparatus using an electrophotography process, such as a laser beam printer (LBP), a digital copying machine, a multi-function printer, or the like.

2. Description of the Related Art

Conventionally, various multi-beam light scanning apparatuses are proposed, which use a multi-beam light source unit including a plurality of light sources (light emitting portions) (see Japanese Patent Application Laid-Open No. 2004-070108). In this multi-beam light scanning apparatus, if the plurality of light emitting portions are arranged in the sub scanning direction vertically, an interval (pitch) between the scanning lines in the sub scanning direction on a scanned surface is significantly larger than an interval corresponding to recording density. Therefore, the plurality of light emitting portions are usually arranged obliquely to the sub scanning direction, and a slanting angle thereof is adjusted so that the interval between the scanning lines in the sub scanning direction on the scanned surface is precisely adjusted according to the recording density.

In the image forming apparatus, the multi-beam light scanning apparatus as described above is often used to satisfy a demand for high speed. In addition, in order to satisfy a demand for a small size simultaneously, as described in Japanese Patent Application Laid-Open No. 2004-070108, a plurality of scanned surfaces (surfaces to be scanned) are scanned by a single rotational polygon mirror, and for this purpose, a structure is often used, in which, for Embodiment, a light beam enters a surface perpendicular to the rotation axis S of the rotational polygon mirror from an oblique direction with respect to the sub scanning direction. Hereinafter, this optical system is referred to as an "oblique-incidence optical system". In the multi-beam light scanning apparatus as described above, it is important to set an imaging magnification ratio in a sub scanning section of the imaging optical system between the deflection surface of the rotational polygon mirror and the scanned surface to be uniform over the entire effective image region. It is because if the imaging magnification ratio in the sub scanning section of the imaging optical system is not uniform, a scanning line pitch of a plurality of beams on the scanned surface in the sub scanning direction does not become uniform in the effective image region. However, in the oblique-incidence optical system, when the multi-beam light source is used, if the imaging magnification ratio in the sub scanning section of the imaging optical system is set to be constant in the entire effective scanning region, the scanning line pitch of the plurality of beams on the scanned surface in the sub scanning direction becomes different between a scanning start side and a scanning end side.

FIG. 22A is a schematic diagram of a main part of the image forming apparatus using the multi-beam light source unit and the oblique-incidence optical system. The image forming apparatus illustrated in FIG. 22A includes a plurality of photosensitive members as the scanned surfaces (usually, four photosensitive members corresponding to four colors of yellow (Y), magenta (M), cyan (C), and black (K)). In this type of image forming apparatus, if scanning lines as illustrated in FIG. 22B are drawn continuously in the sub scanning direction on every scanned surface of the scanned surfaces corresponding to the individual colors, all of the four colors of Y, M, C, and K coincide. However, for Embodiment, if scanning lines as illustrated in FIG. 22B are drawn continuously in the sub scanning direction on the scanned surfaces corresponding to the colors Y and K, and if scanning lines as illustrated in FIG. 22C are drawn continuously in the sub scanning direction on the scanned surfaces corresponding to the colors M and color C, a problem will arise.

Specifically, all the four colors of Y, M, C, and K coincide at the middle portion in the main scanning direction, but Y and K are shifted from M and C in the sub scanning direction at portions other than the middle portion in the main scanning direction. As a result, all the four colors coincide at the middle portion of the output image in the main scanning direction, but at portions other than the middle portion in the main scanning direction, particularly on the scanning start side and the scanning end side, the four colors do not coincide, so that a color shift is observed. In other words, in the image forming apparatus which uses the multi-beam light source unit having the structure illustrated in FIG. 22A and uses the oblique-incidence optical system, on the scanned surfaces corresponding to colors C and M, scanning lines as illustrated in FIG. 22B are drawn continuously in the sub scanning direction. In addition, on the scanned surfaces corresponding to colors K and color Y, scanning lines as illustrated in FIG. 22C are drawn continuously in the sub scanning direction. As a result, at portions other than the middle portion in the main scanning direction, colors C and M do not coincide with colors K and Y, so that a color shift in the sub scanning direction is observed.

SUMMARY OF THE INVENTION

It is an object of the present invention to provide a multi-beam light scanning apparatus and an image forming apparatus using the same, which are suitable for output of a high definition image and are capable of correcting appropriately a color shift of an image printed on photosensitive members corresponding to a plurality of colors, in particular, a color shift in a sub scanning direction that is conspicuous at an end portion in a main scanning direction.

In a multi-beam light scanning apparatus according to the present invention, a deflection surface of a rotational polygon mirror has a conjugate relationship with a scanned surface in a sub scanning section, a difference between a number of folds in a sub scanning direction of an optical path from the rotational polygon mirror to the scanned surface that corresponds to a light beam entering a surface perpendicular to a rotation axis of the rotational polygon mirror obliquely from an upper direction and a number of folds in the sub scanning direction of an optical path from the rotational polygon mirror to the scanned surface that corresponds to a light beam entering the surface perpendicular to the rotation axis of the rotational polygon mirror obliquely from below direction is an even number, and as to light emitting portions for starting to write image data of a head line on a plurality of the scanned surfaces, a light emitting portion corresponding to printing of the head line in the sub scanning direction among a plurality of light emitting portions of the light source unit that emit the light beam entering the surface perpendicular to the rotation axis of the rotational polygon mirror obliquely from the upper direction, and a light emitting portion corresponding to printing of the head line in the sub scanning direction among a plurality of light emitting portions of the light source unit that emit the light beam entering the surface perpendicular to the rotation axis of the rotational polygon mirror obliquely from below direction are set to be light emitting portions at different positions in the sub scanning direction.

According to the present invention, it is possible to attain a multi-beam light scanning apparatus and an image forming apparatus, which are suitable for output of a high definition image and is capable of correcting appropriately a color shift of an image printed on photosensitive members corresponding to a plurality of colors, in particular, a color shift that is conspicuous at an end portion in a main scanning direction.

Further features of the present invention will become apparent from the following description of exemplary embodiments with reference to the attached drawings.

DESCRIPTION OF THE EMBODIMENTS

Hereinafter, Embodiments of the present invention are described with reference to the attached drawings.

[Embodiment 1]

Figure 1A:
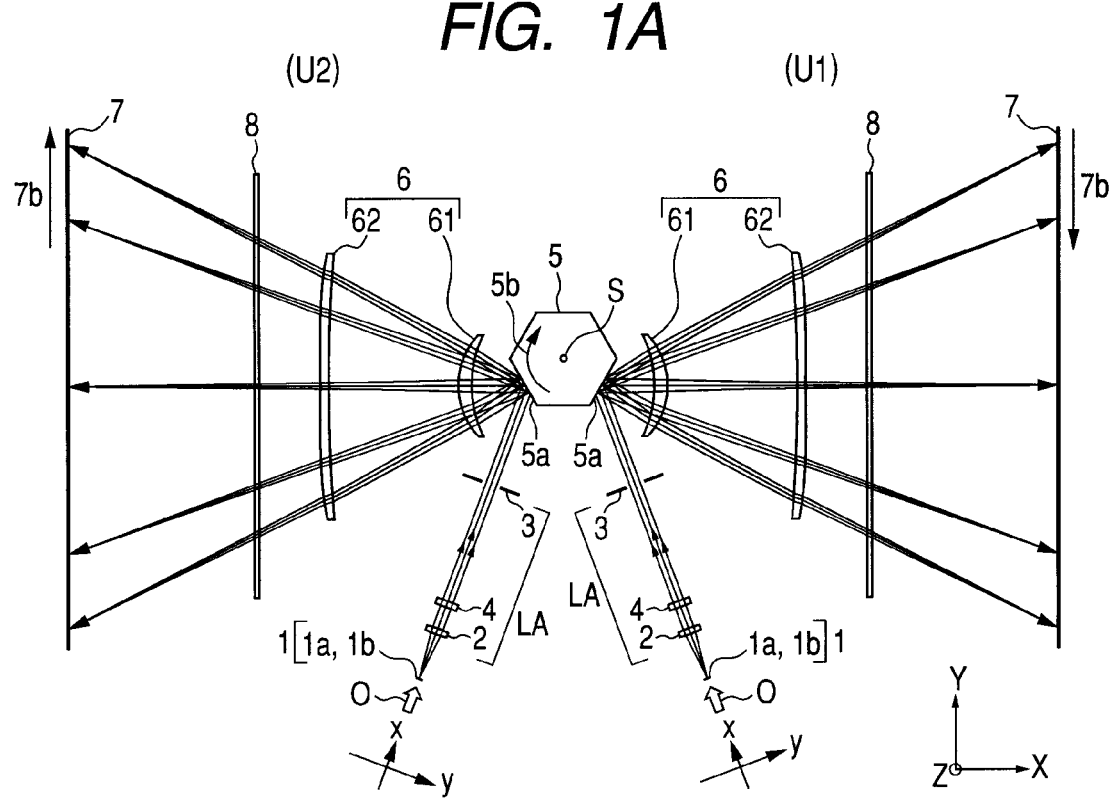
FIG. 1A is a sectional view of a main part in a main scanning direction according to Embodiment 1.
Figure 1B:
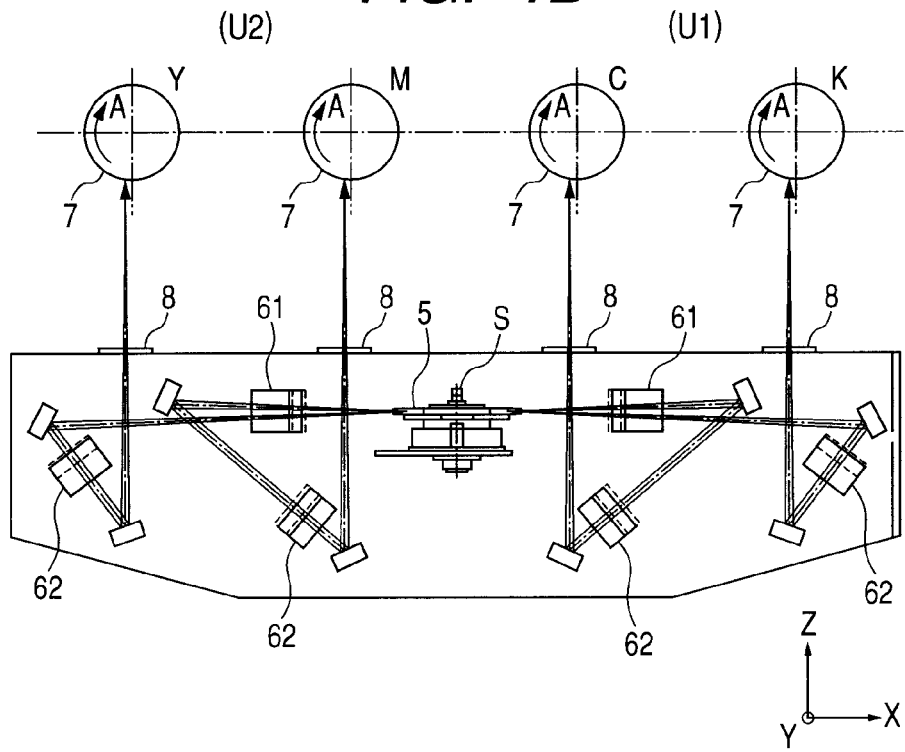
FIG. 1B is a sectional view of a main part in a sub scanning direction according to Embodiment 1.
Figure 2A:
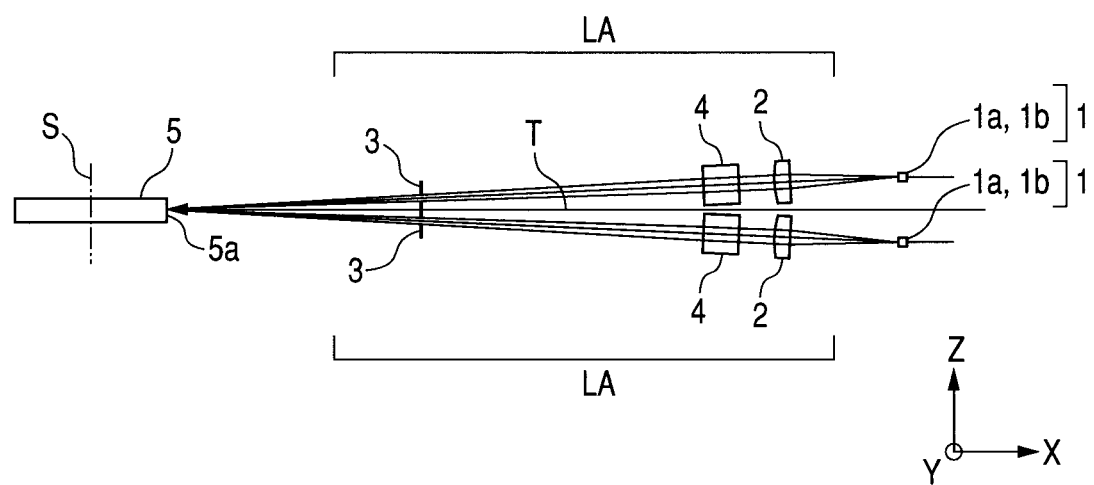
FIG. 2A is a sectional view of a main part in the sub scanning direction of an incident optical system according to Embodiment 1.

FIG. 1A is a schematic diagram of a main part (main scanning sectional view) of a multi-beam light scanning apparatus according to Embodiment 1 of the present invention viewed from a main scanning direction. FIG. 1B is a sectional view of a main part in a sub scanning direction (sub scanning sectional view) of the multi-beam light scanning apparatus according to Embodiment 1 of the present invention, which is applied to an image forming apparatus such as a color laser beam printer or a digital color copying machine. Note that FIG. 1B illustrates an optical path from an optical deflector (rotational polygon mirror) 5 to a scanned surface 7. FIG. 2A is an explanatory diagram of an incident optical system LA using the multi-beam light source unit according to Embodiment 1 of the present invention. FIG. 2A illustrates a main part in the sub scanning direction from two light emitting portions 1a and 1b to the optical deflector 5 of the light scanning apparatus, which is applied to the image forming apparatus.

The incident optical systems LA and LA illustrated in FIG. 2A are disposed on both sides of the optical deflector 5 so as to sandwich the optical deflector 5 as illustrated in FIG. 1A. In FIG. 1A, folds formed by reflection mirrors serving as optical path folding units are omitted in illustration. Note that in the following description the sub scanning direction (Z direction) refers to a direction that is parallel to a rotation axis of a deflection unit (rotational polygon mirror). The main scanning cross section refers to a cross section having the normal in the sub scanning direction (direction parallel to the rotation axis of the deflection unit). The main scanning direction (Y direction) is a direction in which a light beam that is deflectively scanned by the deflection unit is projected to the main scanning cross section. The sub scanning section is a cross section having the normal in the main scanning direction.

In the image forming apparatus of this Embodiment, structures and optical actions of scanning units U1 and U2 that are arranged symmetrically with respect to the optical deflector and serve as the deflection unit are the same. Therefore, in the scanning units U1 and U2, the same elements are denoted by the same reference numerals or symbols. In FIGS. 1A to 2A, a light source unit 1 includes a monolithic multi-beam semiconductor laser having a plurality of light emitting portions (light emitting points) 1a and 1b that are formed on the same substrate with a space therebetween in the main scanning direction. In this Embodiment, the light source unit 1 includes the two light emitting portions 1a and 1b, but this should not be interpreted as a limitation. Three or more light emitting portions may form the light source unit 1.

Figure 2B:
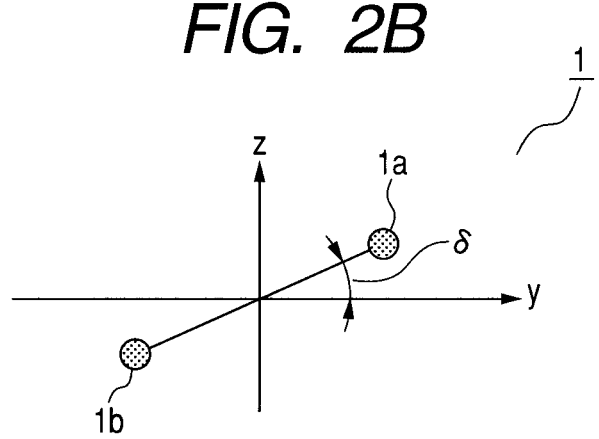
FIG. 2B is a diagram illustrating an arrangement of two light emitting portions according to Embodiment 1.

In FIG. 1A, the main scanning direction corresponds to the Y axis, a direction in which the light beam emitted from the light source unit 1 propagates (direction parallel to the optical axis of the collimator lens in which the light beam propagates) corresponds to the X axis, the sub scanning direction that is perpendicular to the X axis and the Y axis corresponds to the Z axis. The two light emitting portions 1a and 1b are arranged, for Embodiment, as illustrated in FIG. 2B when they are viewed from the direction of an arrow O. Here, the two light emitting portions 1a and 1b are arranged in a slanting direction with respect to the main scanning direction, and the slanting angle δ is adjusted, so that the interval between the scanning lines in the sub scanning direction on the scanned surface 7 is precisely adjusted according to a recording density.

The two light beams emitted from the light source unit 1 (only one light beam is illustrated in the drawings for simple illustration) is converted into a parallel light beam by the collimator lens 2 as a first optical element. Then, the light beam converted into a parallel light beam is converged only in the sub scanning direction by a cylindrical lens 4 as a second optical element. Each of the two light beams converged only in the sub scanning direction by the cylindrical lens 4 is shaped in cross sectional shape by an aperture stop 3 so as to be imaged in a focal line elongated in the main scanning direction on the deflection surface 5a of the optical deflector 5 serving as the deflection unit. Note that the individual elements of the collimator lens 2, the cylindrical lens 4, and the aperture stop 3 each form an element of the incident optical system (oblique-incidence optical system) LA. However, in the present invention, the collimator lens 2 and the cylindrical lens 4 may be integrally formed in a lens unit.

Further, the two light beams deflectively scanned by the deflection surface 5a of the optical deflector 5 rotating at a constant angular velocity in the direction of an arrow 5b in FIGS. 1A and 1B are each condensed into a spot shape on the scanned surface 7 by an imaging optical system (fθ lens system) 6 which has an fθ characteristic and includes two imaging lenses 61 and 62. Further, the scanned surface 7 is scanned by the two light beams at a constant speed in the direction of an arrow 7b in FIGS. 2A and 2B. A dust protection glass 8 is provided for preventing dust or toner from entering inside the apparatus. The fθ lens system 6 forms an optical face tangle error correction optical system which has a conjugate relationship in the sub scanning section between the scanned surface 7 and an imaging position (focal line position) imaged on the deflection surface 5a by the cylindrical lens 4.

The image forming apparatus illustrated in FIG. 1B includes photosensitive members (photosensitive drums) 7 serving as image carriers corresponding to individual colors of Y (yellow), M (magenta), C (cyan), and K (black), that are arranged on the scanned surface 7 from the left in FIG. 1B. The photosensitive members (photosensitive drums) rotate in the same direction of an arrow A. Below an intermediate position between the scanned surfaces 7 corresponding to the color M and the color C, there are disposed the optical deflectors 5. On both sides of each of the optical deflectors 5, first imaging lenses 61 are disposed, one on each side. In addition, as illustrated in FIG. 2A, the incident optical systems (oblique-incidence optical systems) LA and LA are disposed so that the plurality of light beams each enter the deflection surface 5a of the optical deflector 5 with a finite angle (2.5 degrees) obliquely from above and below directions in the sub scanning direction with respect to a surface T perpendicular to a rotation axis S of the optical deflector 5. Then, the plurality of light beams entering the deflection surface 5a from above and below directions in the sub scanning direction at an angle of 2.5 degrees each are deflected and reflected by the deflection surface 5a and enter the same first imaging lens 61 at positions separate from each other in the sub scanning direction at an angle of 2.5 degrees each up and down.

Here, as illustrated in FIG. 1B, the first imaging lens 61 disposed on the left side with respect to the optical deflector 5 is shared by the scanned surfaces 7 corresponding to the color Y and the color M. In addition, the first imaging lens 61 disposed on the right side in FIG. 1B with respect to the optical deflector 5 is shared by the scanned surfaces 7 corresponding to the color C and the color K. Further, the plurality of light beams that have passed through the first imaging lens 61 are reflected in the sub scanning direction by reflection mirrors each corresponding to the color Y, the color M, the color C, and the color K, respectively, and then enter the separate second imaging lenses 62 each disposed for the color Y, the color M, the color C, and the color K, respectively. Further, the plurality of light beams are reflected in the sub scanning direction by the reflection mirrors each corresponding to the color Y, the color M, the color C, and the color K, respectively, and then are each condensed in a spot shape on the scanned surfaces 7 each corresponding to the color Y, the color M, the color C, and the color K, respectively.

Figure 3A:
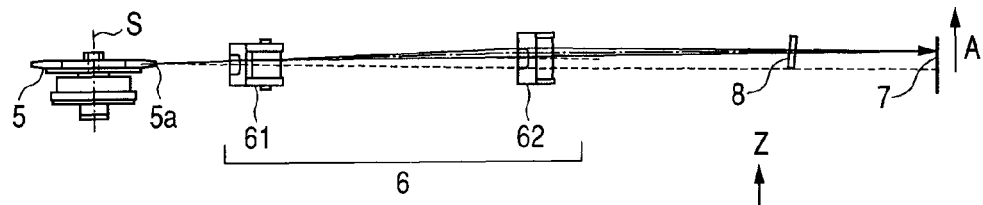
FIGS. 3A and 3B are sectional views of a main part in the sub scanning direction according to Embodiment 1.
Figure 3B:
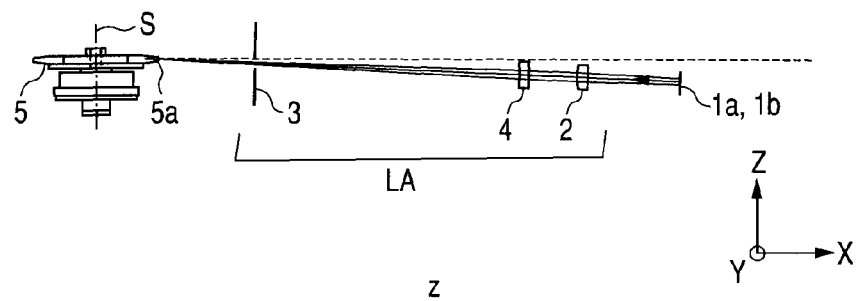

FIGS. 3A and 3B are schematic diagrams of a main part of an incident optical system each using the multi-beam light source unit, which are viewed from the sub scanning direction. FIG. 3A is a sectional view of a main part in the sub scanning direction of the optical path corresponding to the scanned surface 7 of the color C illustrated in FIG. 1B of the imaging optical system 6 from the deflection surface 5a to the scanned surface 7. In FIG. 3A, folds in the sub scanning direction by the reflection mirrors are omitted in illustration. In this case, if the optical path corresponding to the scanned surface 7 of the color C illustrated in FIG. 1B is extended in a state in which no fold is formed by the reflection mirrors, the surface of the scanned surface 7 is moved in the direction of the arrow A. FIG. 3B is a sectional view of a main part in the sub scanning direction of the incident optical system LA from the two light emitting portions 1a and 1b to the deflection surface 5a in FIG. 1B corresponding to the scanned surface 7 of the color C. The incident optical system LA from the two light emitting portions 1a and 1b to the deflection surface 5a is disposed at an angle of 2.5 degrees obliquely downward with respect to the surface T perpendicular to the rotation axis S of the optical deflector 5.

Figure 3C:
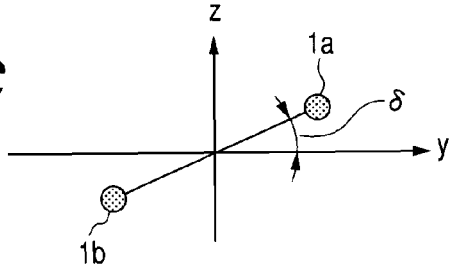
FIG. 3C is a diagram illustrating an arrangement relationship of the two light emitting portions according to Embodiment 1.

The two light beams emitted from the two light emitting portions 1a and 1b enter the deflection surface 5a obliquely from below at an angle of 2.5 degrees. The two light beams deflectively scanned by the deflection surface 5a are reflected obliquely upward and are condensed into spot shapes, on the scanned surface 7 of the color C by the fθ lens system 6. As to an arrangement of the two light emitting portions 1a and 1b in the incident optical system LA corresponding to the scanned surface 7 of the color C, they are arranged as illustrated in FIG. 3C when viewed from the direction of the arrow O of FIG. 1A in the case where the light beam a from the light emitting portion 1a forms an image at a preceding position on the scanned surface in both the main direction and the sub scanning direction. Here, the light emitting portion 1a corresponds to the printing of the head line in the sub scanning direction on the scanned surface 7.

Here, as illustrated in FIG. 3C, if the two light emitting portions 1a and 1b are arranged diagonally, the two light beams a and b enter the deflection surface 5a in the main scanning direction at angles different from each other. Therefore, reflection angles of the two light beams a and b after deflected and reflected by the deflection surface 5a are also different from each other. As a result, spots are imaged on the scanned surface 7 at positions separated from each other in the main scanning direction. Therefore, in the multi-beam light scanning apparatus having this structure, adjustments are made as described below. Specifically, image data items are transmitted at different timings shifted by a predetermined time δT so that a position in the main scanning direction at which a light beam emitted from one of the reference light emitting portions forms an image on the scanned surface 7 coincides with the other imaging position of a light beam emitted from the other light emitting portion in the main scanning direction. Note that the light beam emitted from the reference light emitting portion is usually a light beam emitted from a light emitting portion preceding in the scanning direction, which corresponds to the light emitting portion 1a of FIG. 3C.

Figure 3D:
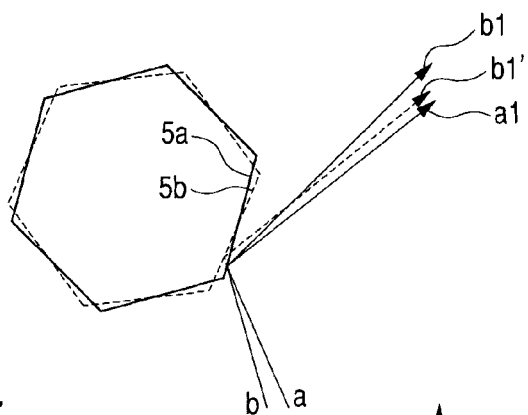
FIG. 3D is a diagram illustrating how two light beams are reflected by a deflection surface according to Embodiment 1.

FIG. 3D is a main scanning sectional view in the case where a scanning start side (upper side of the scanned surface 7 on the right side of FIG. 1A) is scanned on the scanned surface 7 of the color C illustrated in FIG. 1B (corresponding to the scanned surface 7 on the right side with respect to the optical deflector 5 of FIG. 1A). In addition, it is a main scanning sectional view illustrating how a principal ray of the two light beams a and b are reflected by the deflection surface 5a. First, the light beam a emitted from the light emitting portion 1a is reflected by the deflection surface 5a (illustrated in full lines) and is reflected in the direction of the arrow a1, so as to be imaged on the scanned surface 7 with the fθ lens system 6 (not shown) in the right direction in FIG. 3D. The light beam b emitted from the light emitting portion 1b at the same timing is reflected by the deflection surface 5a (illustrated in full lines) and is reflected in the direction of the arrow b1 so as to be imaged on the scanned surface 7 with the fθ lens system 6 (not shown) in the right direction in FIG. 3D. The two light beams a and b after reflected by the deflection surface 5a (illustrated in full lines) at the same timing are each reflected in the different directions of the arrows a1 and b1, respectively.

Therefore, the light beams a and b emitted from the two light emitting portions 1a and 1b are each imaged in a spot shape at positions that are separate from each other in the main scanning direction on the scanned surface 7. Therefore, the image data items are sent at different timings shifted by the predetermined time δT so that the position in the main scanning direction at which the light beam a preceding in the main scanning direction forms an image on the scanned surface 7 coincides with the imaging position in the main scanning direction of the following light beam b (deflection surface in this case is denoted by 5b and is illustrated in dotted lines). In this case, the light beam b emitted from the light emitting portion 1b and is reflected by the deflection surface 5b is reflected in the direction of an arrow b1' (same direction as the arrow a1) so as to be imaged at the same position in the main scanning direction as the preceding light beam a on the scanned surface 7 in the main scanning direction.

Figure 3E:
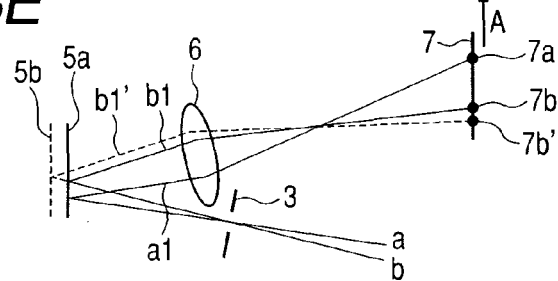
FIG. 3E is a diagram illustrating a change in the interval between two scanning lines on a scanned surface according to Embodiment 1.

FIG. 3E is a sub scanning sectional view in which the scanning start side (upper side of the scanned surface on the right side in the optical deflector illustrated in FIG. 1A) is scanned on the scanned surface 7 of the color C illustrated in FIG. 1B (corresponding to the scanned surface on the right side of the optical deflector illustrated in FIG. 1A). In addition, it is a sub scanning sectional view illustrating how the principal ray of the two light beams a and b are reflected by the deflection surface. Here, with reference to FIG. 3D, a reflection point of the light beam b emitted from the light emitting portion 1b reflected when the timing is shifted by the predetermined time δT is as follows. Specifically, it is understood that the reflection point on the deflection surface 5b (illustrated in dotted lines) of the light beam b with the difference is shifted from the reflection point at which the light beam a emitted from the light emitting portion 1a is reflected by the deflection surface 5a (illustrated in full lines) in the direction separating away from the fθ lens system 6.

In FIG. 3E, the light beams a and b emitted from the two light emitting portions 1a and 1b cross each other in the sub scanning section at the aperture stop 3, and are imaged like focal lines on the deflection surface 5a at positions separated by a predetermined interval in the sub scanning direction. Then, the two light beams a and b reflected at the same timing by the deflection surface 5a (illustrated in full lines) are imaged with the fθ lens system 6 at a position 7a and a position 7b separated by a predetermined interval in the sub scanning direction on the scanned surface 7. Here, as illustrated in FIG. 3A, the scanned surface 7 is moved in the direction indicated by the arrow A from up to down in FIG. 3A. The preceding light beam a first scans the scanned surface 7 in line, and then the following light beam b scans in line the lower side of the line scanned by the preceding light beam a.

Figure 4A:
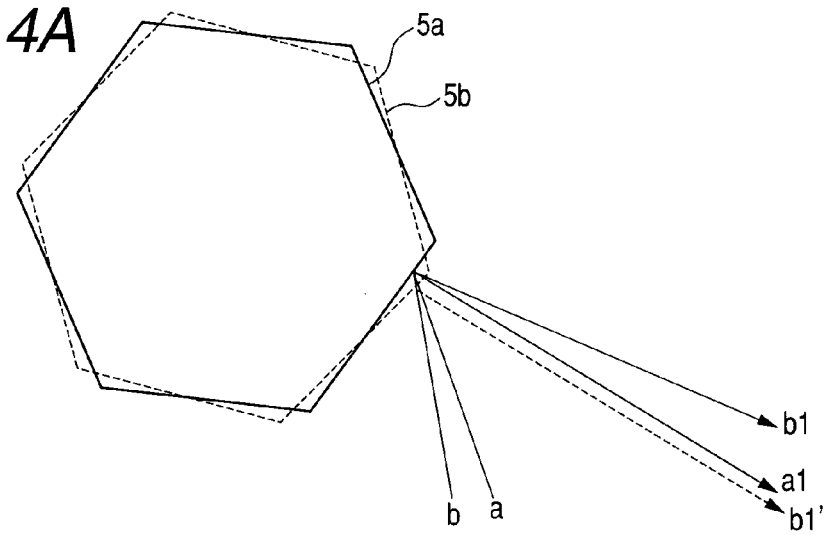
FIGS. 4A and 4B are main scanning sectional views illustrating how two light are reflected by the deflection surface according to Embodiment 1.

A resolution obtained according to this Embodiment in the sub scanning direction is 600 DPI. Therefore, the interval between the imaging position 7a and the imaging position 7b is set to 25.4/600=0.04233 mm=42.33 μm. However, the light beam b reflected by the deflection surface 5b (illustrated in dotted lines) when the timing is shifted by the predetermined time δT so that position in the main scanning direction at which the light beam a preceding in the main scanning direction forms an image on the scanned surface 7 coincides with the imaging position of the following light beam b in the main scanning direction becomes as follows. Specifically, because the deflection surface 5b in this case is shifted in the direction separating away from the fθ lens system 6, the light beam b is deflectively scanned from a position shifted upward in the sub scanning direction on the deflection surface 5b and is reflected in a direction b1'. Therefore, the image is formed at a position 7b', which is shifted downward in the sub scanning direction with respect to the position 7b on the scanned surface 7. In other words, the interval between the scanning lines on the scanned surface 7 is increased with respect to a desired interval (42.33 μm) determined according to the resolution. FIG. 4A is a main scanning sectional view in the case where a scanning end side (lower side in the scanned surface 7 on the right side of FIG. 1A) is scanned on the scanned surface 7 of the color C illustrated in FIG. 1B (corresponding to the scanned surface 7 on the right side of FIG. 1A). In addition, it is a main scanning sectional view illustrating how the principal ray of the two light beams a and b are reflected by the deflection surface 5a.

First, the light beam a emitted from the light emitting portion 1a is reflected by the deflection surface 5a (illustrated in full lines) and is reflected in the direction of the arrow a1, so as to be imaged on the scanned surface 7 with the fθ lens system 6 (not shown) in the right direction. The light beam b emitted from the light emitting portion 1b at the same timing is reflected by the deflection surface 5a (illustrated in full lines) and is reflected in the direction of the arrow b1 so as to be imaged on the scanned surface 7 with the fθ lens system (not shown) in the right direction. The two light beams a and b after reflected by the deflection surface 5a (illustrated in full lines) at the same timing are each reflected in the different directions of the arrows a1 and b1, respectively. Therefore, the light beams a and b emitted from the two light emitting portions 1a and 1b are each imaged in a spot shape at positions that are separate from each other in the main scanning direction on the scanned surface 7. Therefore, the image data items are sent at different timings shifted by the predetermined time δT so that the position in the main scanning direction at which the light beam a preceding in the main scanning direction forms an image on the scanned surface 7 coincides with the imaging position in the main scanning direction of the following light beam b (deflection surface in this case is denoted by 5b and is illustrated in dotted lines). In this case, the light beam b emitted from the light emitting portion 1b and is reflected by the deflection surface 5b is reflected in the direction of an arrow b1' (same direction as the arrow a1) so as to be imaged at the same position in the main scanning direction as the preceding light beam a on the scanned surface 7 in the main scanning direction.

Figure 4B:
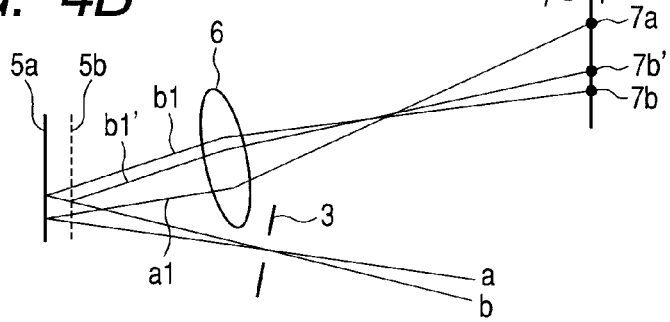

FIG. 4B is a sub scanning sectional view in which the scanning start side (lower side of the scanned surface on the right side in the optical deflector illustrated in FIG. 1A) is scanned on the scanned surface 7 of the color C illustrated in FIG. 1B (corresponding to the scanned surface on the right side of the optical deflector illustrated in FIG. 1A). In addition, it is a sub scanning sectional view illustrating how the principal ray of the two light beams a and b are reflected by the deflection surface. Here, with reference to FIG. 4A, a reflection point of the light beam b emitted from the light emitting portion 1b reflected when the timing is shifted by the predetermined time δT is as follows. Specifically, it is understood that the reflection point on the deflection surface 5b (illustrated in dotted lines) of the light beam b with the difference is shifted from the reflection point at which the light beam a emitted from the light emitting portion 1a is reflected by the deflection surface 5a (illustrated in full lines) in the direction approaching the fθ lens system 6.

In FIG. 4B, the light beams a and b emitted from the two light emitting portions 1a and 1b cross each other in the sub scanning section at the aperture stop 3, and are imaged like focal lines on the deflection surface 5a at positions separated by a predetermined interval in the sub scanning direction. Then, the two light beams a and b reflected at the same timing by the deflection surface 5a (illustrated in full lines) are imaged with the fθ lens system 6 at a position 7a and a position 7b separated by a predetermined interval in the sub scanning direction on the scanned surface 7. Here, as illustrated in FIG. 3A, the scanned surface 7 is moved in the direction indicated by the arrow A from up to down in FIG. 3A. The preceding light beam a first scans the scanned surface 7 in line, and then the following light beam b scans in line the lower side of the line scanned by the preceding light beam a.

A resolution obtained according to this Embodiment in the sub scanning direction is 600 DPI. Therefore, the interval between the imaging position 7a and the imaging position 7b is set to 25.4/600=0.04233 mm=42.33 μm. However, the light beam b reflected by the deflection surface 5b (illustrated in dotted lines) when the timing is shifted by the predetermined time δT so that position in the main scanning direction at which the light beam a preceding in the main scanning direction forms an image on the scanned surface 7 coincides with the imaging position of the following light beam b in the main scanning direction becomes as follows. Specifically, because the deflection surface 5b in this case is shifted in the direction approaching the fθ lens system 6, the light beam b is deflectively scanned from a position shifted downward in the sub scanning direction on the deflection surface 5b and is reflected to a direction b1'. Therefore, the image is formed at a position 7b' shifted upward in the sub scanning direction with respect to the position 7b on the scanned surface 7.

Figure 4C:
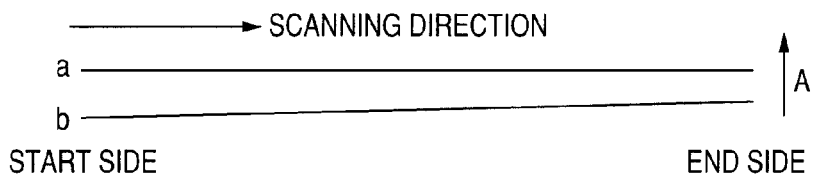
FIGS. 4C and 4D are diagrams illustrating a change in the interval between two scanning lines on the scanned surface according to Embodiment 1.
Figure 4D:
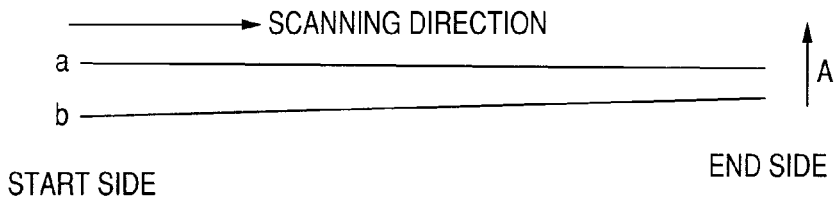

In other words, the interval between the scanning line on the scanned surface 7 is decreased with respect to a desired interval (42.33 μm) determined according to the resolution. As a result, as illustrated in FIG. 4C, the interval between the scanning lines formed by the light beams a and b emitted from the two light emitting portions 1a and 1b becomes larger than the desired interval on the scanning start side on the scanned surface 7, while the interval becomes smaller than the desired interval on the scanning end side. In FIG. 4C, the scanning line by the light beam b emitted from the light emitting portion 1b is drawn obliquely with respect to the scanning line by the light beam a emitted from the light emitting portion 1a. However, in actual assembly and adjustment of the light scanning apparatus, adjustments are made so that inclinations of both scanning lines are substantially in the same state. In other words, the second imaging lens 62 is rotated about the optical axis thereof in a plane perpendicular to the optical axis for adjustment so that the state of the scanning lines as illustrated in FIG. 4D may be realized. Note that the scanned surface 7 is moved in the direction indicated by the arrow A from down to up in FIGS. 4C and 4D.

Figure 5A:
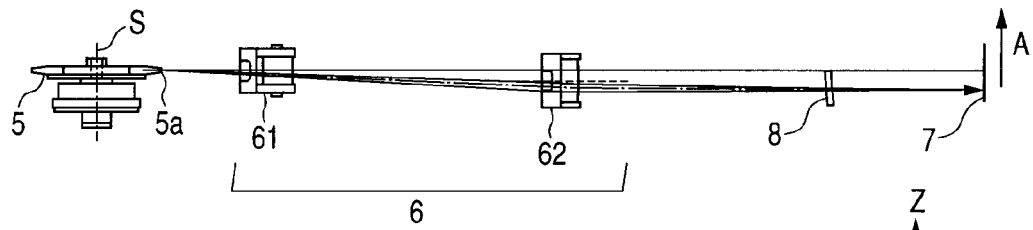
FIGS. 5A and 5B are sectional views of a main part in the sub scanning direction according to Embodiment 1.
Figure 5B:
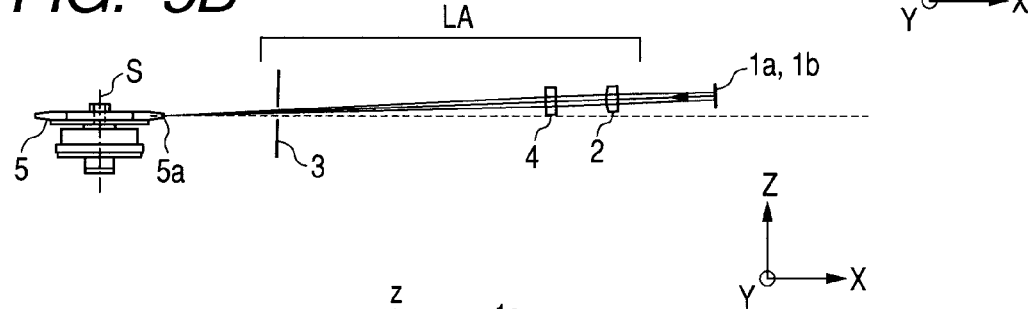

Next, an optical path corresponding to the scanned surface 7 of the color K illustrated in FIG. 1B is described. FIGS. 5A and 5B are schematic diagrams each illustrating a main part of the incident optical system LA using the multi-beam light source unit, which is viewed from the sub scanning direction. FIG. 5A is a sectional view of a main part in the sub scanning direction of the optical path corresponding to the scanned surface 7 of the color K illustrated in FIG. 1B of the imaging optical system from the deflection surface 5a to the scanned surface 7. In FIG. 5A, folds in the sub scanning direction by the reflection mirrors are omitted in illustration. In this case, the optical path corresponding to the scanned surface 7 of the color K illustrated in FIG. 1B is extended in a state in which no fold is formed by the reflection mirrors. Then, because the number of folds formed by the reflection mirrors of the optical path corresponding to the scanned surface 7 of the color C is equal to the number of folds formed by the reflection mirrors of the optical path corresponding to the scanned surface 7 of the color K, the surface of the scanned surface 7 of the color K is moved in the direction of the arrow A.

FIG. 5B is a sectional view in the sub scanning direction of a main part corresponding to the scanned surface 7 of the color K illustrated in FIG. 1B of the incident optical system LA from the two light emitting portions 1a and 1b to the deflection surface 5a. The incident optical system LA from the two light emitting portions 1a and 1b to the deflection surface 5a is disposed obliquely with respect to the plane perpendicular to the rotation axis of the deflection surface (illustrated in dotted lines in the diagram) by an angle of 2.5 degrees upward. Further, the two light beams a and b emitted from the two light emitting portions 1a and 1b enter the deflection surface 5a obliquely from above at an angle of 2.5 degrees. The two light beams a and b deflectively scanned by the deflection surface 5a are reflected obliquely downward and are each condensed into a spot shape on the scanned surface 7 of the color K by the fθ lens system 6. As to an arrangement of the two light emitting portions 1a and 1b in the incident optical system LA corresponding to the scanned surface 7 of the color K, they are arranged as illustrated in FIG. 2B when viewed from the direction of the arrow O illustrated in FIG. 1A in the case where the light beam a from the light emitting portion 1a forms an image at a preceding position on the scanned surface 7 in both the main direction and the sub scanning direction. Here, the light emitting portion 1a corresponds to the printing of the head line in the sub scanning direction on the scanned surface 7. This arrangement is the same as the arrangement of the light emitting portions 1a and 1b in the incident optical system LA corresponding to the scanned surface 7 of the color C.

Figure 5C:
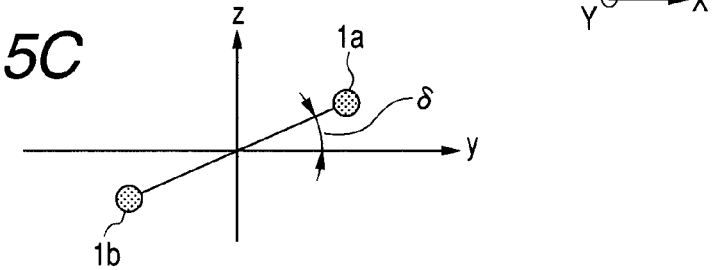
FIG. 5C is a diagram illustrating an arrangement of the two light emitting portions according to Embodiment 1.

Here, as illustrated in FIG. 5C, if the two light emitting portions 1a and 1b are arranged diagonally, the two light beams a and b enter the deflection surface 5a in the main scanning direction at angles different from each other. Therefore, reflection angles of the two light beams a and b after reflected by the deflection surface 5a are also different from each other. As a result, spots are imaged on the scanned surface 7 at positions separated from each other in the main scanning direction. Therefore, in the multi-beam light scanning apparatus having this structure, adjustments are made as described below. Specifically, the image data items are transmitted at different timings shifted by the predetermined time δT so that a position in the main scanning direction at which a light beam emitted from one of the reference light emitting portions forms an image on the scanned surface 7 coincides with the other imaging positions of a light beam emitted from the other light emitting portion in the main scanning direction. Note that the light beam emitted from the reference light emitting portion is usually a light beam emitted from a light emitting portion preceding in the scanning direction, which corresponds to the light emitting portion 1a of FIG. 5C.

Figure 5D:
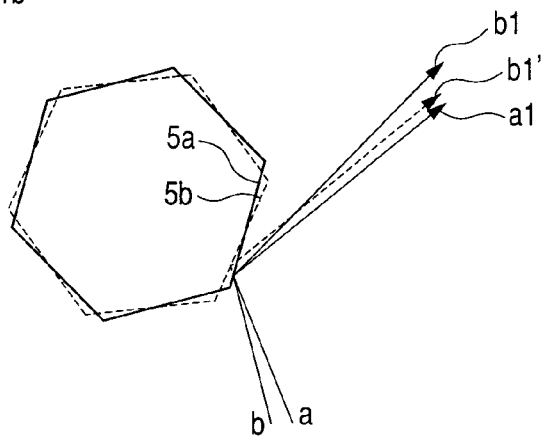
FIG. 5D is a diagram illustrating how two light beams are reflected by the deflection surface according to Embodiment 1.

FIG. 5D is a main scanning sectional view in the case where the scanning start side (upper side of the scanned surface 7 on the right side of FIG. 1A) is scanned on the scanned surface 7 of the color K illustrated in FIG. 1B (corresponding to the scanned surface 7 on the right side of FIG. 1A). In addition, it is a main scanning sectional view illustrating how the principal ray of the two light beams a and b are reflected by the deflection surface 5a. First, the light beam a emitted from the light emitting portion 1a is reflected by the deflection surface 5a (illustrated in full lines) and is reflected in the direction of the arrow a1, so as to be imaged on the scanned surface 7 with the fθ lens system 6 (not shown) in the right direction in FIG. 5D. The light beam b emitted from the light emitting portion 1b at the same timing is reflected by the deflection surface 5a (illustrated in full lines) and is reflected in the direction of the arrow b1 so as to be imaged on the scanned surface 7 with the fθ lens system 6 (not shown) in the right direction in FIG. 5D. The two light beams a and b after reflected by the deflection surface 5a (illustrated in full lines) at the same timing are each reflected in the different directions of the arrows a1 and b1, respectively. Therefore, the light beams a and b emitted from the two light emitting portions 1a and 1b are each imaged in a spot shape at positions that are separate from each other in the main scanning direction on the scanned surface 7.

Therefore, the image data items are sent at different timings shifted by the predetermined time δT so that the position in the main scanning direction at which the light beam a preceding in the main scanning direction forms an image on the scanned surface 7 coincides with the imaging position in the main scanning direction of the following light beam b (deflection surface in this case is denoted by 5b and is illustrated in dotted lines). In this case, the light beam b emitted from the light emitting portion 1b and is reflected by the deflection surface 5b is reflected in the direction of an arrow b1' (same direction as the arrow a1) so as to be imaged at the same position in the main scanning direction as the preceding light beam a on the scanned surface 7 in the main scanning direction.

Figure 5E:
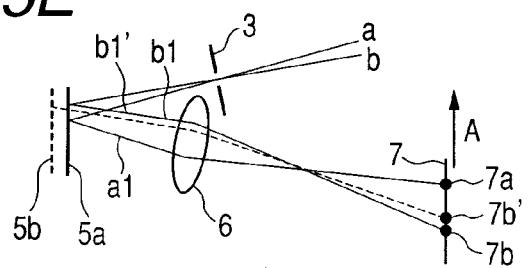
FIG. 5E is a diagram illustrating a change in the interval between two scanning lines on the scanned surface according to Embodiment 1.

FIG. 5E is a sub scanning sectional view in which the scanning start side (upper side of the scanned surface 7 on the right side of FIG. 1A) is scanned on the scanned surface 7 of the color C illustrated in FIG. 1B (corresponding to the scanned surface 7 on the right side of the optical deflector illustrated in FIG. 1A). In addition, it is a sub scanning sectional view illustrating how the principal ray of the two light beams a and b are reflected by the deflection surface. Here, with reference to FIG. 5D, a reflection point of the light beam b emitted from the light emitting portion 1b reflected when the timing is shifted by the predetermined time δT is as follows. Specifically, it is understood that the reflection point on the deflection surface 5b (illustrated in dotted lines) of the light beam b with the difference is shifted from the reflection point at which the light beam a emitted from the light emitting portion 1a is reflected by the deflection surface 5a (illustrated in full lines) in the direction separating away from the fθ lens system 6.

In FIG. 5E, the light beams a and b emitted from the two light emitting portions 1a and 1b cross each other in the sub scanning section at the aperture stop 3, and are imaged like focal lines on the deflection surface 5a at positions separated by a predetermined interval in the sub scanning direction. Then, the two light beams a and b reflected at the same timing by the deflection surface 5a (illustrated in full lines) are imaged with the fθ lens system 6 at a position 7a and a position 7b separated by a predetermined interval in the sub scanning direction on the scanned surface 7. Here, as illustrated in FIG. 5A, the scanned surface 7 is moved in the direction indicated by the arrow A from up to down in FIG. 5A. The preceding light beam a first scans the scanned surface 7 in line, and then the following light beam b scans in line the lower side of the line scanned by the preceding light beam a.

Figure 6A:
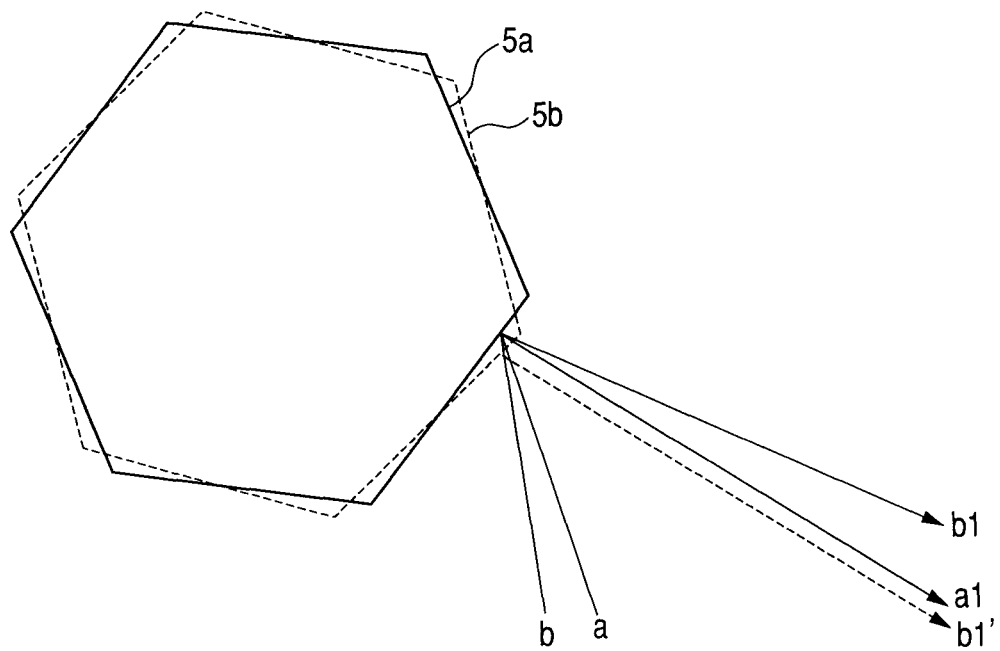
FIG. 6A is a main scanning sectional view illustrating how two light beams are reflected by the deflection surface according to Embodiment 1.

A resolution obtained according to this Embodiment in the sub scanning direction is 600 DPI. Therefore, the interval between the imaging position 7a and the imaging position 7b is set to 25.4/600=0.04233 mm=42.33 µm. However, the light beam b reflected by the deflection surface 5b (illustrated in dotted lines) when the timing is shifted by the predetermined time δT so that position in the main scanning direction at which the light beam a preceding in the main scanning direction forms an image on the scanned surface 7 coincides with the imaging position of the following light beam b in the main scanning direction becomes as follows. Specifically, because the deflection surface 5b in this case is shifted in the direction separating away from the fθ lens system 6, the light beam b is deflectively scanned from the position shifted downward in the sub scanning direction on the deflection surface 5b and is reflected in the direction b1'. Therefore, the image is formed at the position 7b', which is shifted upward in the sub scanning direction with respect to the position 7b, on the scanned surface 7. In other words, the interval between the scanning line on the scanned surface 7 is decreased with respect to the desired interval (42.33 µm) determined according to the resolution. FIG. 6A is a main scanning sectional view in the case where the scanning start side (upper side in the scanned surface 7 on the right side in FIG. 1A) is scanned on the scanned surface 7 of the color K illustrated in FIG. 1B (corresponding to the scanned surface 7 on the right side of FIG. 1A). In addition, it is a main scanning sectional view illustrating how the main light beams of the two light beams a and b are reflected by the deflection surface 5a.

First, the light beam a emitted from the light emitting portion 1a is reflected by the deflection surface 5a (illustrated in full lines) and is reflected in the direction of the arrow a1, so as to be imaged on the scanned surface 7 with the fθ lens system 6 (not shown) in the right direction. The light beam b emitted from the light emitting portion 1b at the same timing is reflected by the deflection surface 5a (illustrated in full lines) and is reflected in the direction of the arrow b1 so as to be imaged on the scanned surface 7 with the fθ lens system (not shown) in the right direction. The two light beams a and b after reflected by the deflection surface 5a (illustrated in full lines) at the same timing are each reflected in the different directions of the arrows a1 and b1, respectively. Therefore, the light beams a and b emitted from the two light emitting portions 1a and 1b are each imaged in a spot shape at positions that are separate from each other in the main scanning direction on the scanned surface 7.

Therefore, the image data items are sent at different timings shifted by the predetermined time δT so that the position in the main scanning direction at which the light beam a preceding in the main scanning direction forms an image on the scanned surface 7 coincides with the imaging position in the main scanning direction of the following light beam b (deflection surface in this case is denoted by 5b and is illustrated in dotted lines). In this case, the light beam b emitted from the light emitting portion 1b and is reflected by the deflection surface 5b is reflected in the direction of an arrow b1' (same direction as the arrow a1) so as to be imaged at the same position in the main scanning direction as the preceding light beam a on the scanned surface 7 in the main scanning direction.

Figure 6B:
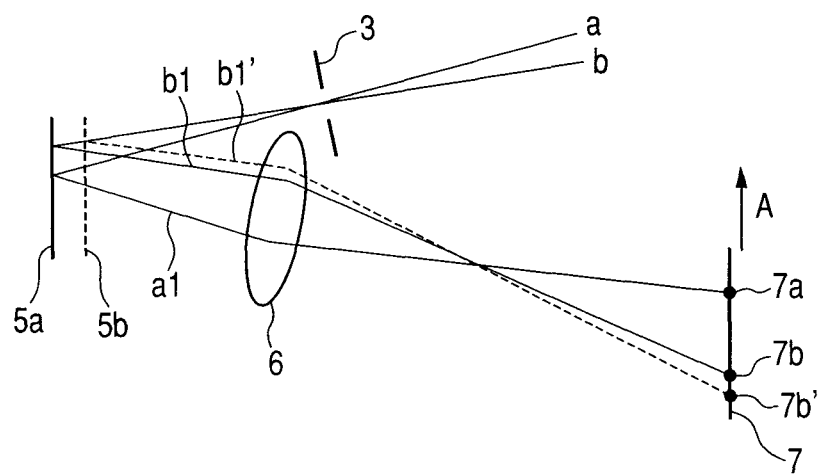
FIG. 6B is a diagram illustrating a change in the interval between two scanning lines on the scanned surface according to Embodiment 1.

FIG. 6B is a sub scanning sectional view in which the scanning start side (upper side of the scanned surface on the right side in the optical deflector illustrated in FIG. 1A) is scanned on the scanned surface 7 of the color K illustrated in FIG. 1B (corresponding to the scanned surface on the right side of the optical deflector illustrated in FIG. 1A). In addition, it is a sub scanning sectional view illustrating how the principal ray of the two light beams a and b are reflected by the deflection surface. Here, with reference to FIG. 6A, a reflection point of the light beam b emitted from the light emitting portion 1b reflected when the timing is shifted by the predetermined time δT is as follows. Specifically, it is understood that the reflection point on the deflection surface 5b (illustrated in dotted lines) of the light beam b with the difference is shifted from the reflection point at which the light beam a emitted from the light emitting portion 1a is reflected by the deflection surface 5a (illustrated in full lines) in the direction approaching the fθ lens system 6.

In FIG. 6B, the light beams a and b emitted from the two light emitting portions 1a and 1b cross each other in the sub scanning section at the aperture stop 3, and are imaged like focal lines on the deflection surface 5a at positions separated by a predetermined interval in the sub scanning direction. Then, the two light beams a and b reflected at the same timing by the deflection surface 5a (illustrated in full lines) are imaged with the fθ lens system 6 at a position 7a and a position 7b separated by a predetermined interval in the sub scanning direction on the scanned surface 7. Here, as illustrated in FIG. 5A, the scanned surface 7 is moved in the direction indicated by the arrow A from up to down in FIG. 5A. The preceding light beam a first scans the scanned surface 7 in line, and then the following light beam b scans in line the lower side of the line scanned by the preceding light beam a.

A resolution obtained according to this Embodiment in the sub scanning direction is 600 DPI. Therefore, the interval between the imaging position 7a and the imaging position 7b is set to 25.4/600=0.04233 mm=42.33 µm. However, the light beam b reflected by the deflection surface 5b (illustrated in dotted lines) when the timing is shifted by the predetermined time δT so that position in the main scanning direction at which the light beam a preceding in the main scanning direction forms an image on the scanned surface 7 coincides with the imaging position of the following light beam b in the main scanning direction becomes as follows. Specifically, because the deflection surface 5b in this case is shifted in the direction approaching the fθ lens system 6, the light beam b is deflectively scanned from the position shifted upward in the sub scanning direction on the deflection surface 5b and is reflected in the direction b1'. Therefore, the image is formed at the position 7b' shifted downward in the sub scanning direction with respect to the position 7b on the scanned surface 7. In other words, the interval between the scanning line on the scanned surface 7 is increased with respect to the desired interval (42.33 µm) determined according to the resolution. As a result, as illustrated in FIG. 7A, the interval between the scanning lines formed by the light beams a and b emitted from the two light emitting portions 1a and 1b becomes smaller than a desired interval on the scanning start side on the scanned surface 7, while the interval becomes larger than the desired interval on the scanning end side.

Figure 7A:
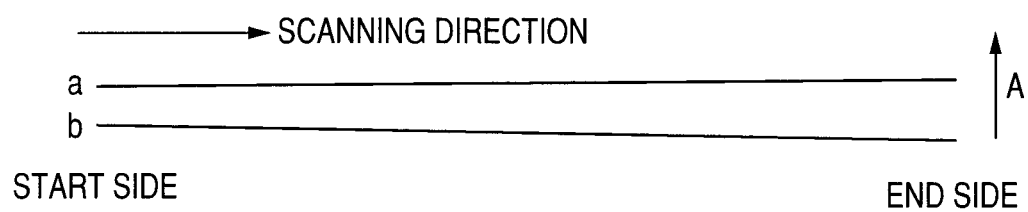
FIGS. 7A, 7B and 7C are diagrams each illustrating a change in the interval between two scanning lines on the scanned surface according to Embodiment 1.
Figure 7B:
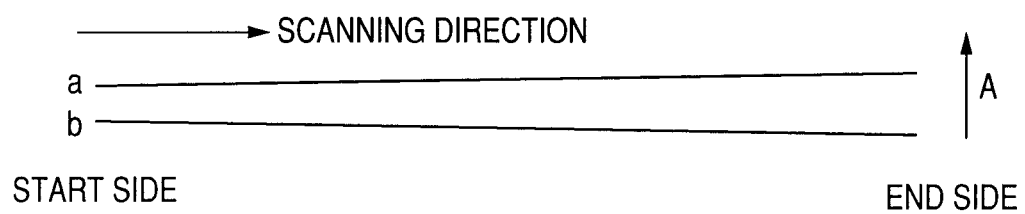

In FIG. 7A, the scanning line by the light beam b emitted from the light emitting portion 1b is drawn obliquely with respect to the scanning line by the light beam a emitted from the light emitting portion 1a. However, in actual assembly and adjustment of the light scanning apparatus, adjustments are made so that inclinations of both scanning lines are substantially in the same state. In other words, the second imaging lens 62 is rotated about the optical axis thereof in a plane perpendicular to the optical axis for adjustment so that the state of the scanning lines as illustrated in FIG. 7B is realized. Note that the scanned surface 7 is moved in the direction indicated by the arrow A from down to up in FIGS. 7A and 7B. The interval between the scanning lines formed by the light beams a and b emitted from the two light emitting portions 1a and 1b on the scanned surface 7 illustrated in FIG. 7B is smaller than a desired interval on the scanning start side and is larger than the same on the scanning end side, which is the opposite relationship to that illustrated in FIG. 4D.

Figure 7C:
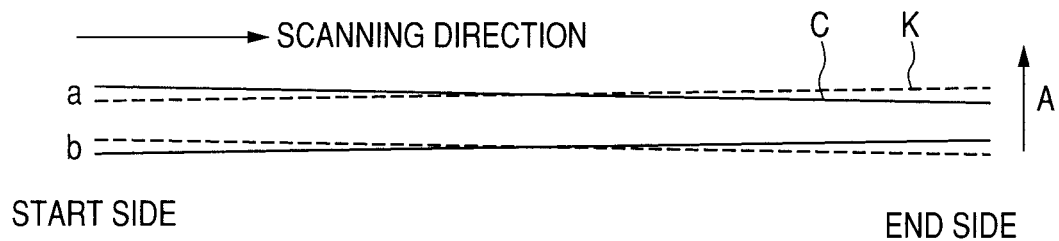

In other words, in the image forming apparatus using the incident optical system LA using the multi-beam light source having the structure as illustrated in FIG. 1B, the scanning line as illustrated in FIG. 5D is drawn continuously in the sub scanning direction on the scanned surface 7 corresponding to the color C. In addition, on the scanned surface 7 corresponding to the color K, the scanning line as illustrated in FIG. 7B is drawn continuously in the sub scanning direction. As a result, as illustrated in FIG. 7C, the color C and the color K do not coincide with each other, except for a middle portion in the main scanning direction, with the result that a color shift in the sub scanning direction is observed. Note that, in FIG. 7C, the scanning line on the scanned surface 7 corresponding to the color C is illustrated in full lines. Further, the scanning line on the scanned surface 7 corresponding to the color K is illustrated in dotted lines.

In view of the above, it is set in this Embodiment so that the scanning line on the scanned surface 7 corresponding to the color C and the scanning line on the scanned surface 7 corresponding to the color K coincide with each other in the entire scanning region in the sub scanning direction. In other words, in this Embodiment, among a plurality of light emitting portions 1a and 1b of the light source unit 1 corresponding to the light beam entering the surface T perpendicular to the rotation axis S of the optical deflector 5 obliquely from the upper direction, the light emitting portion corresponding to the printing of the head line in the sub scanning direction (color K) is set to the light emitting portion 1a. In addition, among the plurality of light emitting portions 1a and 1b of the light source unit 1 corresponding to the light beam entering the surface T perpendicular to the rotation axis S of the optical deflector 5 obliquely from below direction, the light emitting portion corresponding to the printing of the head line in the sub scanning direction (color C) is set to the light emitting portion 1a. In this case, the light emitting portions 1a and 1a for the color K and the color C corresponding to the printing of the head line in the sub scanning direction are different from each other in the sub scanning direction. In other words, in this Embodiment, the light emitting portion of the color K and the light emitting portion of the color C for starting to write image data of the head line in the sub scanning direction are different from each other so that the light emitting portion of the color K becomes the light emitting portion 1b while the light emitting portion of the color C becomes the light emitting portion 1a.

Figure 8A:
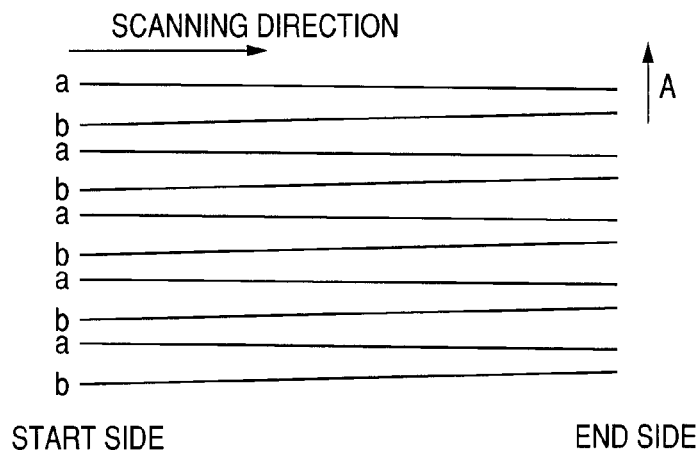
FIGS. 8A, 8B and 8C are diagrams each illustrating changes in intervals among a plurality of scanning lines on the scanned surface according to Embodiment 1.
Figure 8B:
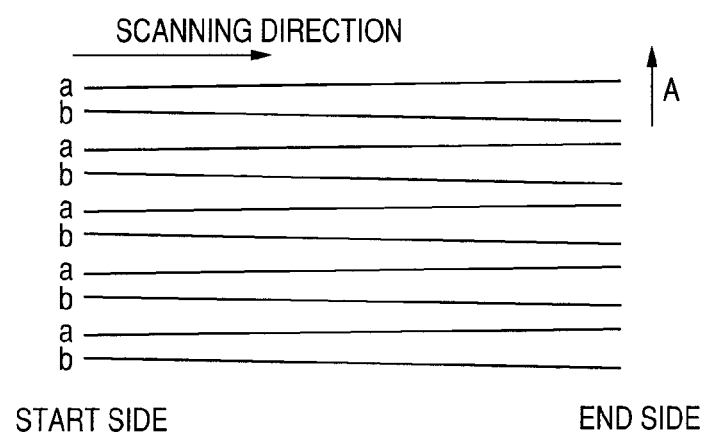

Hereinafter, specific description is given. FIG. 8A illustrates an actual output image in the case where the scanning lines on the scanned surface 7 corresponding to the color C illustrated in FIG. 4D are printed continuously and repeatedly in the sub scanning direction. In this case, image data of the head line in the sub scanning direction is printed by the light emitting portion 1a corresponding to the printing of the head line in the sub scanning direction. Next, FIG. 8B similarly illustrates an actual output image in the case where the scanning lines on the scanned surface 7 corresponding to the color K illustrated in FIG. 7B are printed continuously and repeatedly in the sub scanning direction. Even in this case, the image data in the head line in the sub scanning direction indicates an output image in the case where the printing is performed by the light emitting portion 1a corresponding to the printing of the head line in the sub scanning direction. If the printing is normally performed in this state, it is apparent from FIGS. 8A and 8B that the color C and the color K do not coincide with each other, except for a middle portion in the main scanning direction, with the result that a color shift in the sub scanning direction is observed.

Figure 8C:
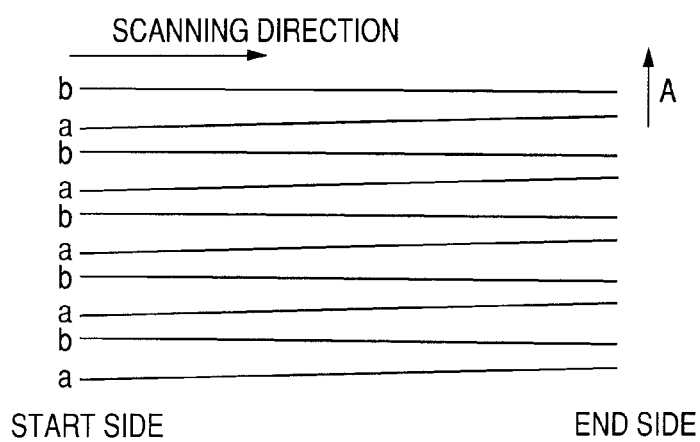

Therefore, in this Embodiment, when printing an image corresponding to the color K, the print control is performed so that the image data of the head line in the sub scanning direction is printed by using the light emitting portion 1b, rather than the light emitting portion 1a corresponding to the printing of the head line in the sub scanning direction. An image corresponding to the color K output in this way is illustrated in FIG. 8C. It is apparent from FIGS. 8A and 8C that the scanning line on the scanned surface 7 corresponding to the color C and the scanning line on the scanned surface 7 corresponding to the color K coincide with each other in the entire scanning region in the sub scanning direction.

In this Embodiment, when an image corresponding to the color K is printed, the print control is performed so that the image data of the head line in the sub scanning direction is printed by using the light emitting portion 1b. However, this should not be interpreted as a limitation, but the opposite structure may be adopted. Specifically, when printing an image corresponding to the color C, the print control may be performed so that the image data of the head line in the sub scanning direction is printed by using the light emitting portion 1b. Thus, in this Embodiment, as described above, the light emitting portions 1a and 1a for the color K and the color C, which correspond to the printing of the head line in the sub scanning direction, are different from each other in the sub scanning direction. Thus, the scanning line on the scanned surface 7 corresponding to the color C and the scanning line on the scanned surface 7 corresponding to the color K may coincide with each other in the entire scanning region in the sub scanning direction. Thus, in this Embodiment, a high definition image without a color shift may be output.

In this Embodiment, the optical system corresponding to the color C and the color K is described above, but it is needless to say that the same is true for the optical system (scanning unit U2) corresponding to the color Y and the color M on the opposite side with respect to the optical deflector 5. Table 1 and Table 2 show various characteristics of the multi-beam imaging optical system according to this Embodiment. Shapes in the main scanning sectional view of lens surfaces of the first imaging lens 61 and the second imaging lens 62 constituting the fθ lens system 6 are aspheric shapes expressed by Expression 1 below.

$$x = \frac{y^2/R}{1 + (1 - (1+k)(y/R)^2)^{1/2}} + \sum_{i=4}^{16} B_i y^i \qquad \text{[Expression 1]}$$

where the intersection of each lens surface and the optical axis is the origin, the optical axis direction is the X axis, the axis perpendicular to the optical axis in the main scanning sectional view is set to the Y axis, and further, the axis perpendicular to the optical axis in the sub scanning section is the Z axis.

Here, R represents a radius of curvature, k represents the eccentricity, and $B_4$ to $B_{16}$ represent aspheric coefficients. Here, if the coefficient is different between a positive side (upper side in FIG. 1A) and a negative side (lower side in FIG. 1A) of the Y axis, a suffix u is added to a coefficient on the positive side while a suffix l is added to a coefficient on the negative side. Note that the main scanning cross sectional shape of the second imaging lens 62 on the optical deflector 5 side is an arc shape. In addition, sub scanning direction shapes of both lens surfaces of the first imaging lens 61 and the lens surface of the second imaging lens 62 on the optical deflector 5 side are arc shapes with a radius of curvature r of the sub scanning section. Next, the shape of the lens surface of the second imaging lens 62 on the scanned surface 7 side in the sub scanning direction has a radius of curvature r' in the sub scanning direction that varies continuously along the Y coordinate of the lens surface and is in a shape expressed by Expression 2 below.

$$r' = r \times \left(1 + \sum_{j=2}^{10} D_j y^j\right) \quad \text{[Expression 2]}$$

Here, r represents a radius of curvature in the sub scanning direction on the optical axis, and $D_2$ to $D_{10}$ represent variation coefficients of the radius of curvature in the sub scanning direction. Here, if the coefficient is different between the positive side (upper side in FIG. 1A) and the negative side (lower side in FIG. 1A) of the Y axis, a suffix u is added to a coefficient on the positive side while a suffix l is added to a coefficient on the negative side.

TABLE 1

| | | | |
|---|---|---|---|
| Working reference wavelength | γ | nm | 790 |
| The number of light emitting points | n | | 2 |
| Thickness of semiconductor laser cover glass | dcg | mm | 0.25000 |
| Refractive index of semiconductor laser cover glass | n0 | | 1.51052 |
| Light emitting point to collimator lens first surface | d0 | mm | 23.35000 |
| Radius of curvature of collimator lens first surface | R1 | mm | ∞ |
| Thickness of collimator lens | d1 | mm | 3.00000 |
| Refractive index of collimator lens | n1 | | 1.76167 |
| Radius of curvature of collimator lens second surface | R2 | mm | −19.04573 |
| Collimator lens first surface to cylindrical lens first surface | d2 | mm | 11.00000 |
| Radius of curvature of cylindrical lens first surface in sub scanning direction | Rs3 | mm | 85.51720 |
| Radius of curvature of cylindrical lens first surface in main scanning direction | Rm3 | mm | ∞ |
| Thickness of cylindrical lens | d3 | mm | 3.00000 |
| Refractive index of cylindrical lens | n3 | | 1.52397 |
| Radius of curvature of cylindrical lens second surface | R4 | mm | ∞ |
| Cylindrical lens second surface to aperture stop | d4 | mm | 59.37142 |
| Aperture stop to polygon deflecting reflection surface | d5 | mm | 50.04763 |
| Polygon deflecting reflection surface to first fθ lens first surface | d6 | mm | 26.00000 |
| Thickness of first fθ lens | d7 | mm | 6.00000 |
| Refractive index of first fθ lens | n7 | | 1.52397 |
| First fθ lens second surface to second fθ lens first surface | d8 | mm | 63.00000 |
| Thickness of second fθ lens | d9 | mm | 4.00000 |
| Refractive index of second fθ lens | n9 | | 1.52397 |
| Second fθ lens second surface to scanned surface | d10 | mm | 121.00000 |
| Thickness of dust protection glass | t | mm | 2.00000 |
| Refractive index of dust protection glass | n10 | | 1.51052 |
| Incident angle of incident optical system polygon | γ | degree | 70.00000 |
| Maximum effective light beam scanning angle | η | degree | 35.04795 |
| Radius of polygon circumscribed circle | r | mm | 20.00000 |
| The number of polygon surfaces | men | | 6 |
| Aperture stop diameter | φM × φS (Ellipse) | mm | 4.3 × 1.16 |

TABLE 2

| fθ lens shape | | | |
|---|---|---|---|
| First surface | | Second surface | |
| First fθ lens | | | |
| R | −46.80512 | R | −31.56080 |
| k | −1.34744E+01 | k | −1.64469E−01 |
| B4 | −1.48339E−05 | B4u | 1.68445E−06 |
| B6 | 4.12140E−08 | B6u | 2.79391E−09 |
| B8 | −5.75512E−11 | B8u | 1.66183E−11 |
| B10 | 2.12016E−14 | B10u | −2.83587E−14 |
| | | B4l | 1.69318E−06 |
| | | B6l | 2.70936E−09 |
| | | B8l | 1.70296E−11 |
| | | B10l | −2.89644E−14 |
| r | 1000.00000 | r | 1000.00000 |
| Second fθ lens | | | |
| R | −707.80044 | R | 966.60036 |
| k | 0.00000E+00 | k | 1.89336E+02 |
| B4 | 0.00000E+00 | B4 | −4.98843E−07 |
| B6 | 0.00000E+00 | B6 | 4.67046E−11 |
| B8 | 0.00000E+00 | B8 | −2.22312E−15 |
| B10 | 0.00000E+00 | B10 | −3.43926E−19 |
| r | 188.04800 | r | −32.75990 |
| | | D2u | 1.07209E−04 |
| | | D4u | −2.15605E−08 |
| | | D6u | 3.87858E−12 |
| | | D8u | −2.94439E−16 |
| | | D10u | 0.00000E+00 |
| | | D2l | 1.07290E−04 |
| | | D4l | −2.41989E−08 |
| | | D6l | 4.52974E−12 |
| | | D8l | −3.33971E−16 |
| | | D10l | 0.00000E+00 |

Figure 9A:
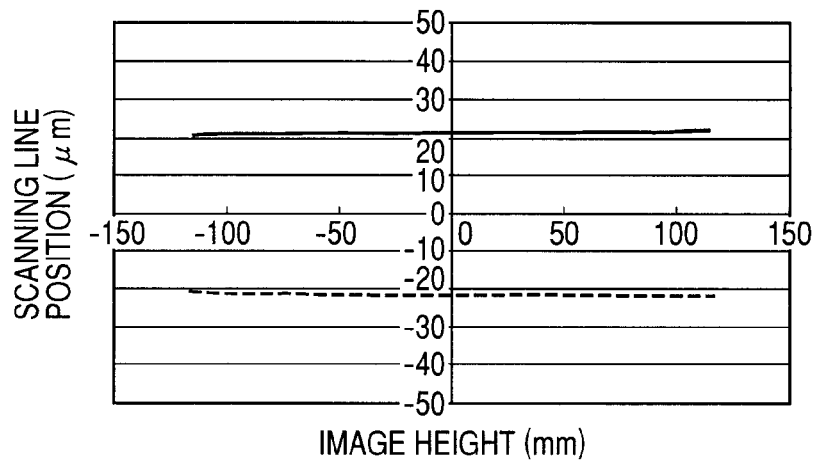
FIGS. 9A, 9C, and 9E are graphs each illustrating a change in the interval between two scanning lines on the scanned surface according to Embodiment 1.
Figure 9B:
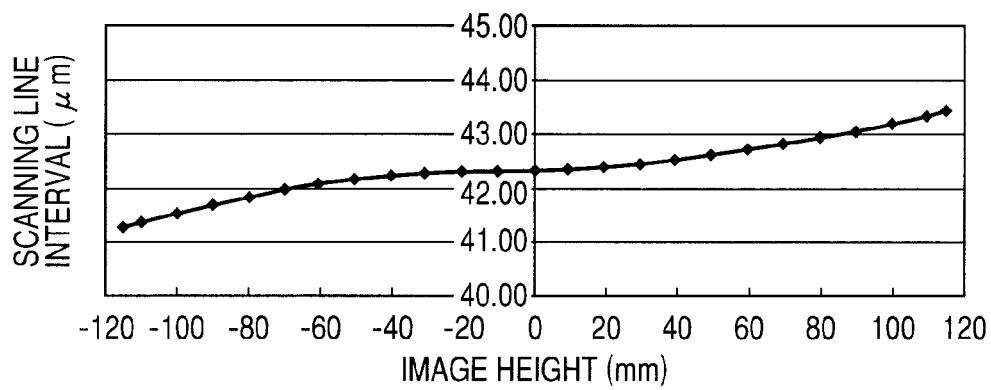
FIGS. 9B, 9D, and 9F are graphs each illustrating a change in the interval between two scanning lines on the scanned surface according to Embodiment 1.

FIG. 9A illustrates actual scanning lines of two lines scanned by the two light emitting portions 1a and 1b on the scanned surface 7 of the color C illustrated in FIG. 1B. Here, the light emitting portion 1a is selected as the one for starting to write the image data of the head line in the sub scanning direction. The interval at the middle portion of the scanning is 42.33 µm, which corresponds to 600 DPI, the interval at the end portion of the scanning on the start side (end portion on the negative side of image height) is 41.27 µm, and the interval at the end portion of the scanning on the end side (end portion on the positive side of the image height) is 43.42 µm. FIG. 9B illustrates an actual interval in the sub scanning direction of the two lines scanned by the two light emitting portions 1a and 1b on the scanned surface 7 of the color C illustrated in FIG. 1B.

Figure 9C:
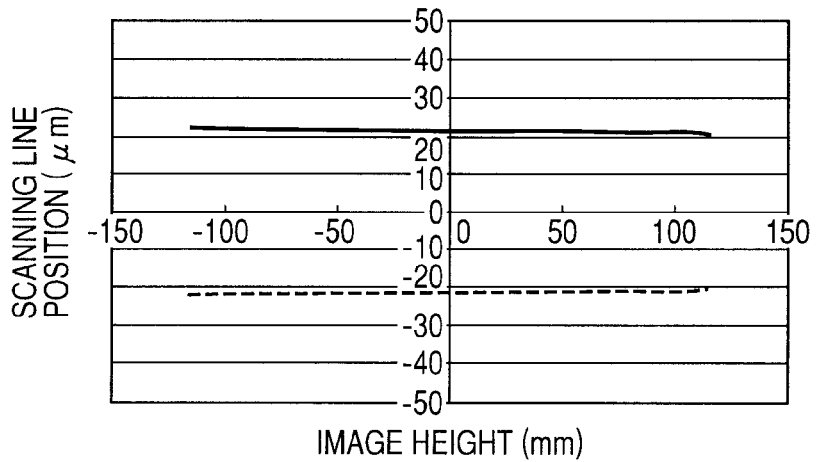
Figure 9D:
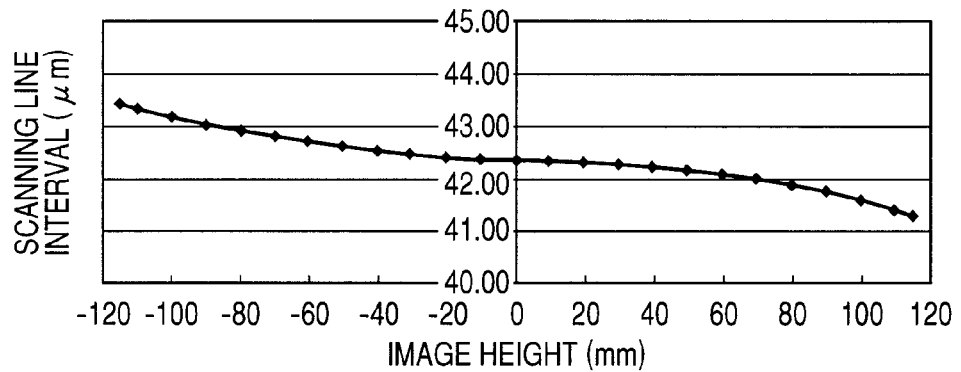

In addition, FIG. 9C illustrates the actual scanning lines of two lines scanned by the two light emitting portions 1a and 1b on the scanned surface 7 of the color K illustrated in FIG. 1B in the case where the light emitting portion 1a is selected as the one for starting to write the image data of the head line in the sub scanning direction. The interval at the middle portion of the scanning is 42.33 µm, which corresponds to 600 DPI, the interval at the end portion of the scanning on the start side (end portion on the negative side of image height) is 43.42 µm, and the interval at the end portion of the scanning on the end side (end portion on the positive side of the image height) is 41.27 µm. Thus, it is understood that a result is opposite to that of FIG. 9A in the main scanning direction is obtained. FIG. 9D illustrates an actual interval in the sub scanning direction of the two lines scanned by the two light emitting portions 1a and 1b on the scanned surface 7 of the color K illustrated in FIG. 1B in the case where the light emitting portion 1a is selected as the one for starting to write the image data of the head line in the sub scanning direction.

Figure 9E:
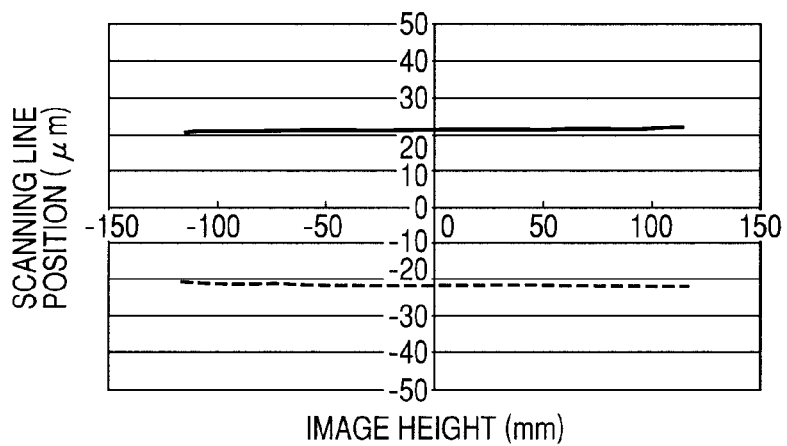
Figure 9F:
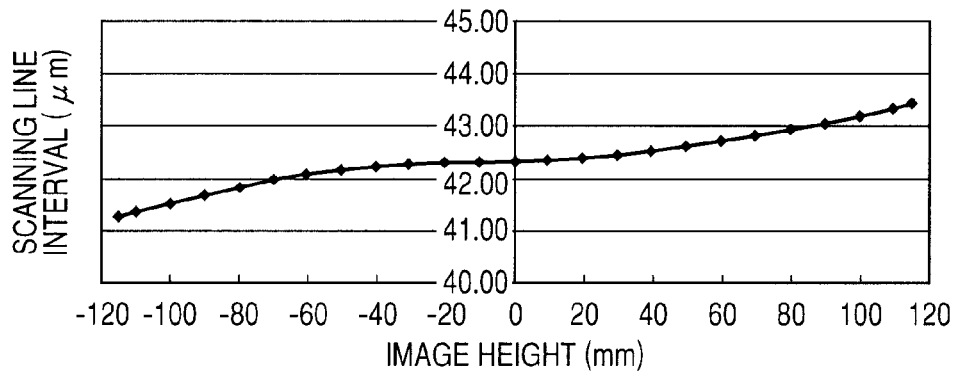

Next, FIG. 9E illustrates the actual scanning lines of two lines scanned by the two light emitting portions 1a and 1b on the scanned surface 7 of the color K illustrated in FIG. 1B in the case where the light emitting portion 1a is selected, rather than the light emitting portion 1b, as the one for starting to write the image data of the head line in the sub scanning direction as described above. In this case, it is understood that the lines of FIG. 9E are completely the same as the actual scanning line of the two lines scanned by the two light emitting portions 1a and 1b on the scanned surface 7 of the color C illustrated in FIG. 1B in the case where the light emitting portion 1a is selected as the one for starting to write the image data of the head line in the sub scanning direction. FIG. 9F illustrates the actual scanning lines of two lines scanned by the two light emitting portions 1a and 1b on the scanned surface 7 of the color K illustrated in FIG. 1B in the case where the light emitting portion 1a is selected, rather than the light emitting portion 1b, as the one for starting to write the image data of the head line in the sub scanning direction.

Similarly, the interval when the light emitting portion 1a is selected as the one for starting to write the image data of the head line in the sub scanning direction is completely the same as the interval between the two actual lines in the sub scanning direction scanned by the two light emitting portions 1a and 1b on the scanned surface 7 of the color C as illustrated in FIG. 1B. Thus, in this Embodiment, as described above, if the number of folds formed by the reflection mirrors in the optical path corresponding to the scanned surface 7 of the color C is equal to the number of folds formed by the reflection mirrors in the optical path corresponding to the scanned surface 7 of the color K, the setting is made as follows. Specifically, the light emitting portions 1a and 1a for the color K and the color C corresponding to the printing of the head line in the sub scanning direction are set to be different from each other in the sub scanning direction. With this configuration, the scanning line on the scanned surface 7 corresponding to the color C and the scanning line on the scanned surface 7 corresponding to the color K may coincide with each other in the sub scanning direction in the entire scanning region. Thus, in this Embodiment, a high definition image without a color shift may be output.

Here, description is given of the case where the number of folds formed by the reflection mirror in the optical path corresponding to the scanned surface 7 of the color C is equal to the number of folds formed by the reflection mirror in the optical path corresponding to the scanned surface 7 of the color K. However, this should not be interpreted as a limitation. The same effect may be obtained as long as a difference between the number of folds formed by the reflection mirror in the optical path corresponding to the scanned surface 7 of the color C and the number of folds formed by the reflection mirror in the optical path corresponding to the scanned surface 7 of the color K is an even number. In this Embodiment, because the number of folds formed by the reflection mirror in the optical path corresponding to the scanned surface 7 of the color C and the number of folds formed by the reflection mirror in the optical path corresponding to the scanned surface 7 of the color K are equal to each other, a difference between the numbers of folds is zero, which and is an even number. Further, it is needless to say that the same effect as the optical system corresponding to the color C and the color K may be obtained also in the optical system (scanning unit U2) corresponding to the color Y and the color M disposed on the opposite side with respect to the optical deflector 5.

In the Embodiment 1, as described above, a difference between a first number of folds of the light beam entering the surface perpendicular to the rotation axis of the rotational polygon mirror in the sub scanning section from the obliquely upward direction and being reflected by the reflection mirrors and a second number of folds of the light beam entering the surface perpendicular to the rotation axis of the rotational polygon mirror in the sub scanning section from the obliquely downward direction and being reflected by the reflection mirrors is an even number.

In addition, when among a plurality of light emitting portions of the plurality of light source units that emit the light beams entering the surface perpendicular to the rotation axis of the rotational polygon mirror in the sub scanning section from the obliquely upward direction, a first light emitting portion is defined to correspond to printing of a first scanning line at a head in the sub scanning direction, while among a plurality of light emitting portions of the plurality of light source units that emit the light beams entering the surface perpendicular to the rotation axis of the rotational polygon mirror in the sub scanning section from obliquely downward direction, a second light emitting portion is defined to correspond to printing of a second scanning line at the head in the sub scanning direction, a height of the first light emitting portion in the sub scanning direction on the plurality of light source units is different from a height of the second light emitting portion in the sub scanning direction on the plurality of light source units, so as to reduce a deviation between the first scanning line drawn on the scanned surface and the second scanning line drawn on the scanned surface in the sub scanning direction.

[Embodiment 2]

Figure 10A:
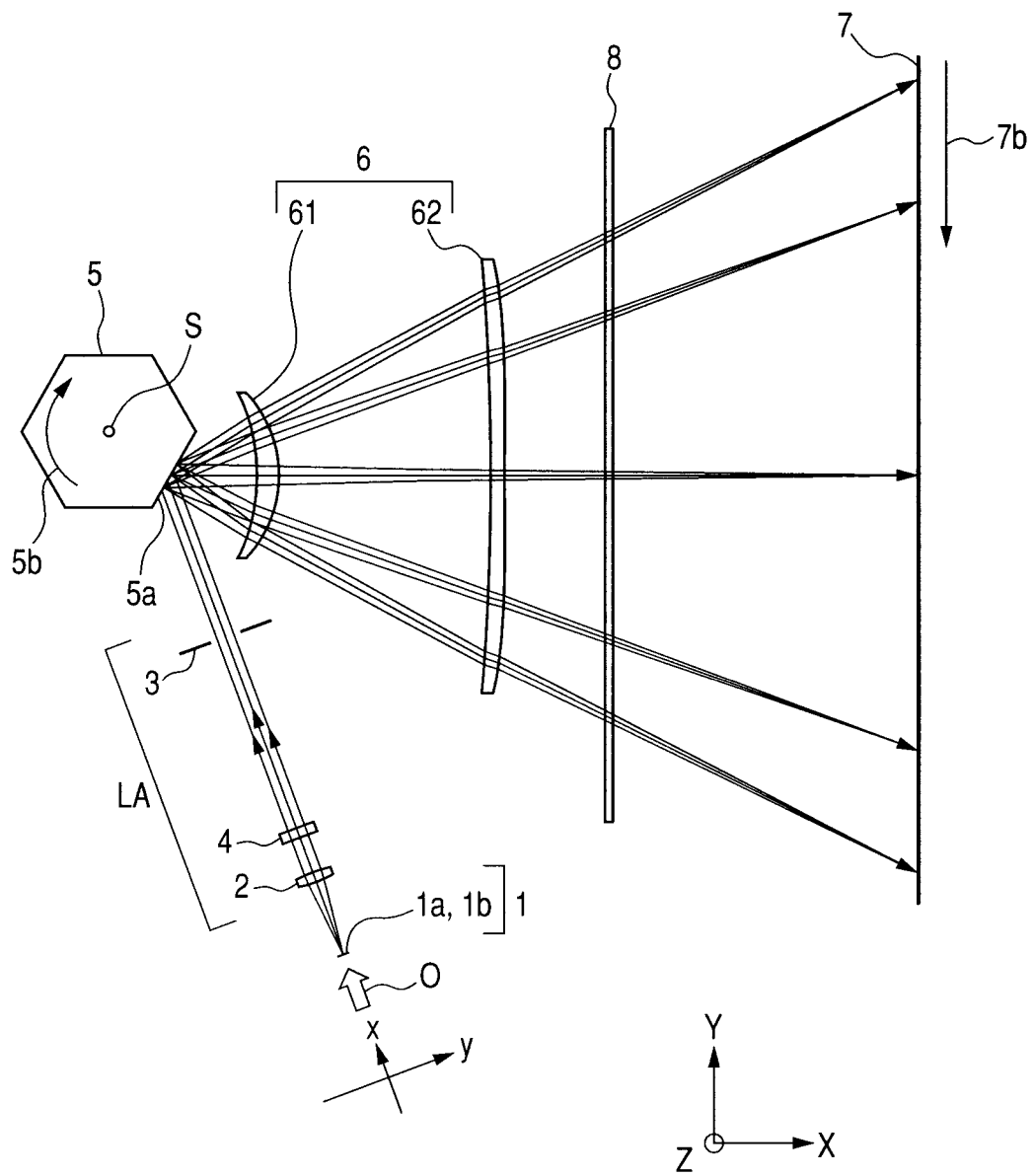
FIG. 10A is a sectional view of a main part in a sub scanning direction according to Embodiment 2.
Figure 10B:
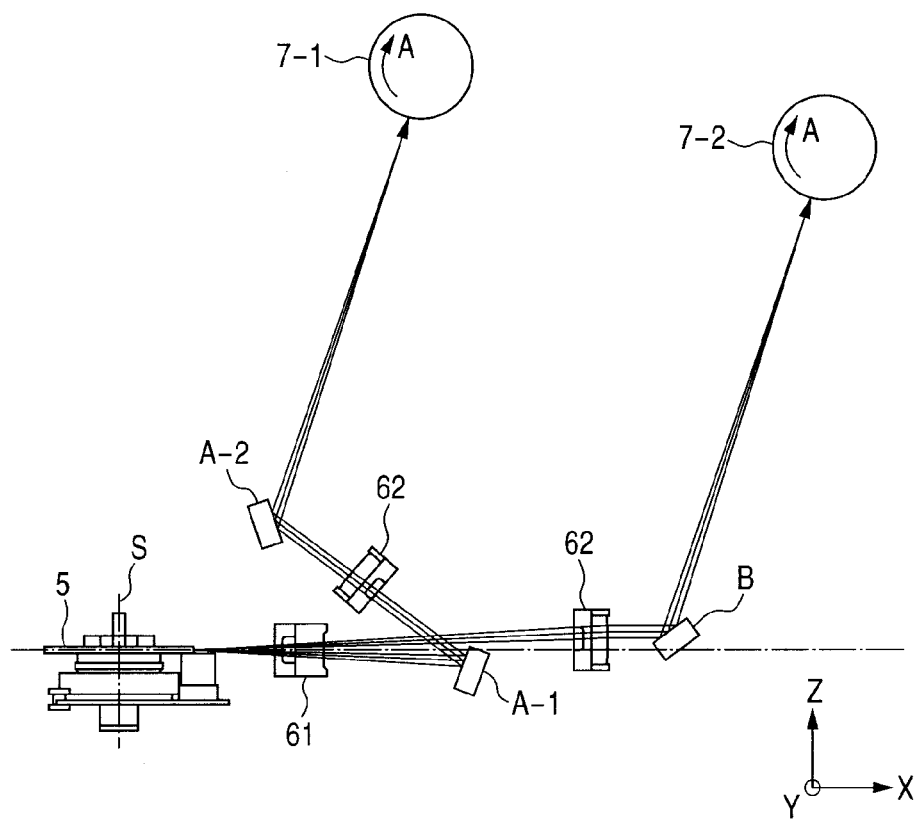
FIG. 10B is a sectional view of a main part in a main scanning direction according to Embodiment 2.
Figure 10C:
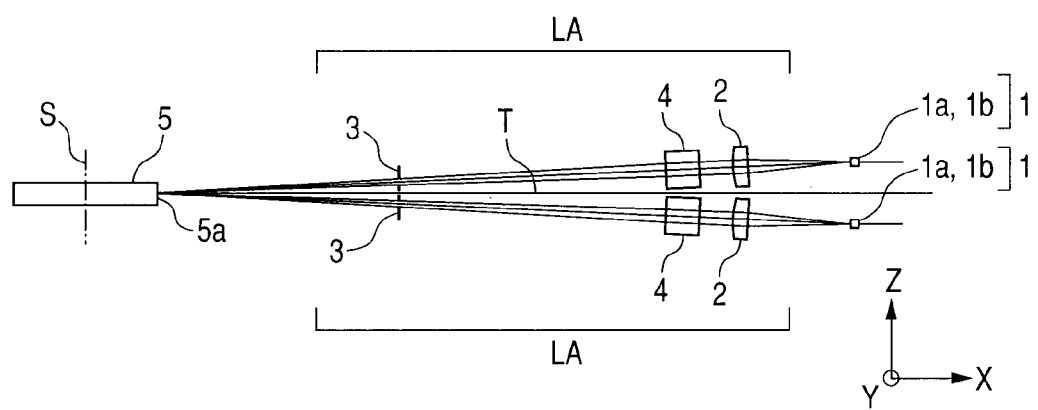
FIG. 10C is a sectional view of a main part of an incident optical system in the sub scanning direction according to Embodiment 2.

FIG. 10A is a schematic diagram of a main part of a multi-beam light scanning apparatus according to Embodiment 2 of the present invention viewed from the main scanning direction. FIG. 10B is a sectional view of a main part in the sub scanning direction of the multi-beam light scanning apparatus according to Embodiment 1 of the present invention, which is applied to an image forming apparatus such as a color laser beam printer or a digital color copying machine. Note that FIG. 10B illustrates an optical path from the optical deflector 5 to the scanned surface 7. FIG. 10C is an explanatory diagram of an incident optical system LA using the multi-beam light source unit according to Embodiment 2 of the present invention. FIG. 10C illustrates a main part in the sub scanning direction from two light emitting portions 1a and 1b to the optical deflector 5 of the light scanning apparatus, which is applied to the image forming apparatus.

In FIG. 10A to FIG. 10C, the same elements as those of FIGS. 1A and 1B are denoted by the same reference numerals or symbols. Note that folds formed by the reflection mirrors are omitted in FIG. 10A. This Embodiment is different from Embodiment 1 described above in that one of the number of folds in the optical path in the sub scanning direction between the optical deflector 5 and the scanned surface 7-1 and the number of folds in the optical path in the sub scanning direction between the optical deflector 5 and the scanned surface 7-2 is set to an even number while the other is set to an odd number. Further, a difference between the both numbers of folds is set to an odd number.

In FIGS. 10A to 10C, the image forming apparatus using the multi-beam light scanning apparatus of this Embodiment has a structure in which a plurality of light beams enter one optical deflector 5, so that a plurality of scanned surfaces 7-1 and 7-2 are optically scanned simultaneously. The plurality of scanned surfaces 7-1 and 7-2 rotate in the same direction of the arrow A as illustrated in FIG. 10B. In this Embodiment, a plurality of light beams entering the deflection surface 5a from the incident optical system LA with angles of 2.5 degrees each from above and below in the sub scanning direction are deflected and reflected by the deflection surface 5a and enter positions in the same first imaging lens 61 that are separated in the sub scanning direction with angles of 2.5 degrees each from above and below. Then, the light beam emitted from the first imaging lens 61 toward the scanned surface 7-1 is reflected by the reflection mirror A-1 and enters the second imaging lens 62, and is further reflected by the reflection mirror A-2 so as to scan the scanned surface 7-1. On the other hand, the light beam emitted from the first imaging lens 61 toward the scanned surface 7-2 directly enters another second imaging lens 62 having the same shape disposed separately, and is reflected by the reflection mirror B so as to scan the scanned surface 7-2.

In this Embodiment, unlike Embodiment 1 described above, in the optical path from the optical deflector 5 to the scanned surface 7-1, there are disposed two reflection mirrors as optical path folding units for folding the optical path in the sub scanning direction. In addition, in the optical path from the optical deflector 5 to the scanned surface 7-2, there is disposed one reflection mirror as the optical path folding unit for folding the optical path in the sub scanning direction. In other words, this Embodiment has a feature in that the number of the reflection mirrors is set differently between the optical path to the scanned surface 7-1 and the optical path to the scanned surface 7-2, so that the number of folds is set to an even number in one of the optical paths while it is set an odd number in the other one of the optical paths, and a difference between those numbers of folds is set to an odd number. In this Embodiment, two light scanning apparatuses illustrated in FIG. 10B are disposed laterally in parallel with each other, so as to constitute a color image forming apparatus of four colors (Y, M, C, and K). Note that the scanned surface 7-1 corresponds to the C (M) color while the scanned surface 7-2 corresponds to the K(Y) color.

Figure 11A:
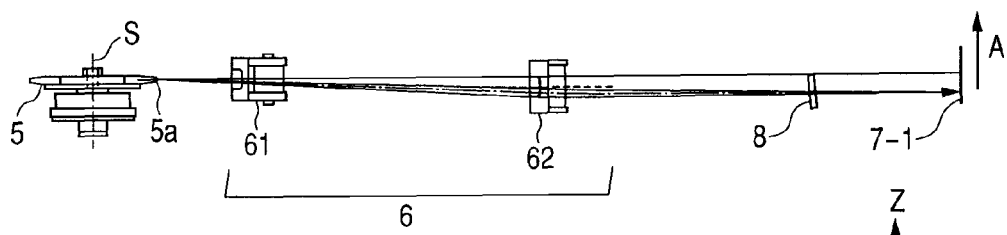
FIGS. 11A and 11B are sectional views of a main part in the sub scanning direction according to Embodiment 2.
Figure 11B:
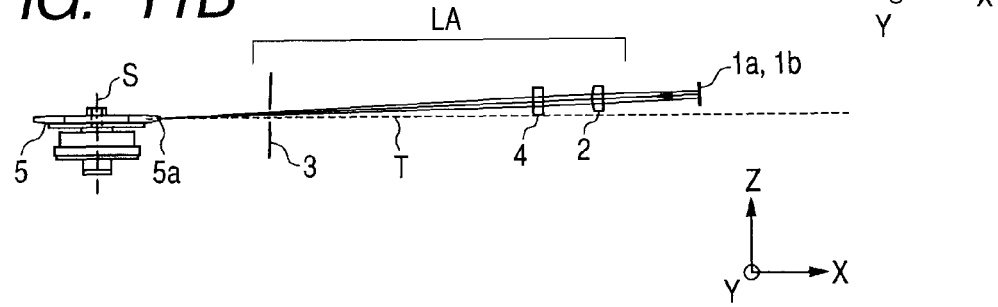

FIGS. 11A and 11B are schematic diagram of a main part of the incident optical system LA using the multi-beam light source, which is viewed from the sub scanning direction. FIG. 11A is a sectional view of a main part of the optical path in the sub scanning direction, the optical path corresponding to the photosensitive member (scanned surface) 7-1 illustrated in FIG. 10B of the imaging optical system from the deflection surface 5a to the scanned surface 7-1. In FIG. 11A, folds in the sub scanning direction formed by the reflection mirrors are omitted in illustration. In this case, if the optical path corresponding to the scanned surface 7-1 illustrated in FIG. 10B is extended in a state in which no the fold is formed by the reflection mirrors, the surface of the scanned surface 7-1 is moved in the direction of the arrow A. FIG. 11B is a sectional view of a main part in the sub scanning direction of the incident optical system LA from the two light emitting portions 1a and 1b to the deflection surface 5a, corresponding to the scanned surface 7-1 illustrated in FIG. 10B.

Figure 11C:
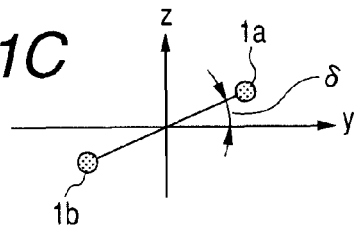
FIG. 11C is a diagram illustrating an arrangement of two light emitting portions according to Embodiment 2.

The incident optical system LA from the two light emitting portions 1a and 1b to the deflection surface 5a is disposed obliquely upward at an angle of 2.5 degrees with respect to the surface T perpendicular to the rotation axis S of the optical deflector 5. Further, the two light beams a and b emitted from the two light emitting portions 1a and 1b enter the deflection surface 5a obliquely from above at an angle of 2.5 degrees. The two light beams a and b that are deflectively scanned by the deflection surface 5a are reflected obliquely downward and each are condensed in an individual spot shape on the scanned surface 7-1 by the fθ lens system 6. As to an arrangement of the light emitting portions 1a and 1b in the incident optical system LA corresponding to the scanned surface 7-1, the light emitting portions 1a and 1b are disposed as illustrated in FIG. 11C viewed from the direction of the arrow O illustrated in FIG. 10A in the case where the light beam a from the light emitting portion 1a forms an image at a preceding position on the scanned surface 7 in both the main direction and the sub scanning direction. Here, the light emitting portion 1a corresponds to the printing of the head line in the sub scanning direction on the scanned surface 7-1.

Here, as illustrated in FIG. 11C, if the two light emitting portions 1a and 1b are arranged diagonally, the two light beams a and b enter the deflection surface 5a in the main scanning direction at angles different from each other. Therefore, reflection angles of the two light beams a and b after deflected and reflected by the deflection surface 5a are also different from each other. As a result, spots are imaged on the scanned surface 7 at positions separated from each other in the main scanning direction. Therefore, in the multi-beam light scanning apparatus having this structure, adjustments are made as described below. Specifically, image data items are transmitted at different timings shifted by the predetermined time δT so that a position in the main scanning direction at which a light beam emitted from one of the reference light emitting portions forms an image on the scanned surface 7 coincides with the other imaging position of a light beam emitted from the other light emitting portion in the main scanning direction. Note that the light beam emitted from the reference light emitting portion is usually a light beam emitted from a light emitting portion preceding in the scanning direction, which corresponds to the light emitting portion 1a of FIG. 11C.

Figure 11D:
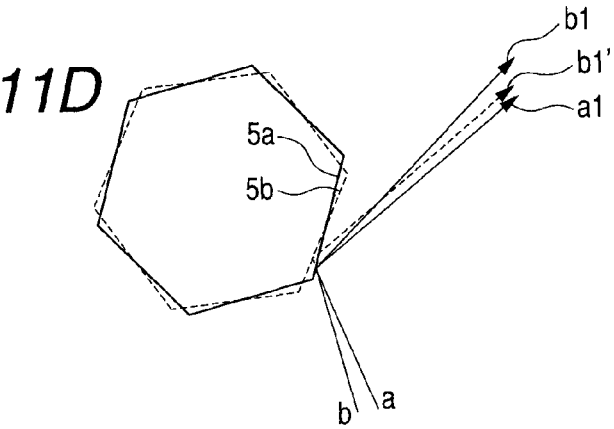
FIG. 11D is a main scanning sectional view illustrating how two light beams are reflected by a deflection surface according to Embodiment 2.

FIG. 11D is a main scanning sectional view illustrating how the principal ray of the two light beams a and b are reflected by the deflection surface 5a when the scanning start side (upper side of FIG. 10A) is scanned on the scanned surface 7-1. First, the light beam a emitted from the light emitting portion 1a is reflected by the deflection surface 5a (illustrated in full lines) and is reflected in the direction of the arrow a1, so as to be imaged on the scanned surface 7-1 with the fθ lens system 6 (not shown) in the right direction. The light beam b emitted from the light emitting portion 1b at the same timing is reflected by the deflection surface 5a (illustrated in full lines) and is reflected in the direction of the arrow b1 so as to be imaged on the scanned surface 7-1 with the fθ lens system 6 (not shown) in the right direction. The two light beams a and b after reflected by the deflection surface 5a (illustrated in full lines) at the same timing are each reflected in the different directions of the arrows a1 and b1, respectively.

Therefore, the light beams a and b emitted from the two light emitting portions 1a and 1b are each imaged in a spot shape at positions that are separate from each other in the main scanning direction on the scanned surface 7-1. Therefore, the image data items are sent at different timings shifted by the predetermined time δT so that the position in the main scanning direction at which the light beam a preceding in the main scanning direction forms an image on the scanned surface 7-1 coincides with the imaging position in the main scanning direction of the following light beam b (deflection surface in this case is denoted by 5b and is illustrated in dotted lines). In this case, the light beam b emitted from the light emitting portion 1b and is reflected by the deflection surface 5b is reflected in the direction of an arrow b1' (same direction as the arrow a1) so as to be imaged at the same position in the main scanning direction as the preceding light beam a on the scanned surface 7 in the main scanning direction.

Figure 11E:
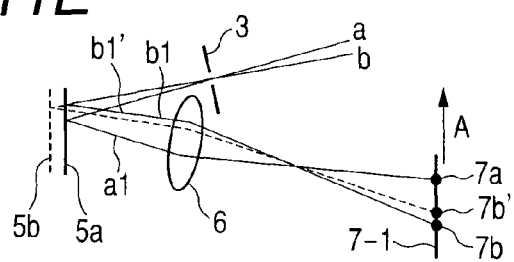
FIG. 11E is a diagram illustrating a change in the interval between two scanning lines on a scanned surface according to Embodiment 2.

FIG. 11E is a sub scanning sectional view illustrating how the principal ray of the two light beams a and b are reflected by the deflection surface 5a when the scanning start side (upper side of FIG. 10A) is scanned on the scanned surface 7-1. Here, with reference to FIG. 15A, a reflection point of the light beam b emitted from the light emitting portion 1b reflected by the deflection surface 5b (illustrated in dotted lines) when the timing is shifted by the predetermined time δT is as follows. Specifically, it is understood that the reflection point of the light beam b is shifted in the direction separating away from the fθ lens system 6 with respect to the reflection point at which the light beam a emitted from the light emitting portion 1a is reflected by the deflection surface 5a (illustrated in full lines).

In FIG. 11E, the light beams a and b emitted from the two light emitting portions 1a and 1b cross each other in the sub scanning section at the aperture stop 3 and are imaged like focal lines at positions separated from each other in the sub scanning direction by a predetermined interval on the deflection surface 5a. Then, the two light beams a and b reflected at the same timing by the deflection surface 5a (illustrated in full lines) are imaged on the scanned surface 7-1 with the fθ lens system 6 at the position 7a and the position 7b separated by a predetermined interval in the sub scanning direction. Here, the scanned surface 7-1 is moved in the direction indicated by the arrow A from down to up in the diagram as illustrated in FIG. 11A. The preceding light beam a first scans the scanned surface 7 in line, and then the following light beam b scans in line the lower side of the line scanned by the preceding light beam a.

A resolution obtained according to this Embodiment in the sub scanning direction is 600 DPI. Therefore, the interval between the imaging position 7a and the imaging position 7b is set to 25.4/600=0.04233 mm=42.33 μm. However, the light beam b reflected by the deflection surface 5b (illustrated in dotted lines) when the timing is shifted by the predetermined time δT so that the position in the main scanning direction at which the light beam a preceding in the main scanning direction forms an image on the scanned surface 7-1 coincides with the imaging position of the following light beam b in the main scanning direction becomes as follows. Specifically, because the deflection surface 5b in this case is shifted in the direction separating away from the fθ lens system 6, the light beam b is deflectively scanned from the position shifted downward in the sub scanning direction on the deflection surface 5b and is reflected in the direction b1'. Therefore, an image is formed at the position 7b' shifted upward in the sub scanning direction with respect to the position 7b on the scanned surface 7-1. In other words, the interval between the scanning line on the scanned surface 7-1 is decreased with respect to the desired interval (42.33 μm) determined according to the resolution.

Figure 12A:
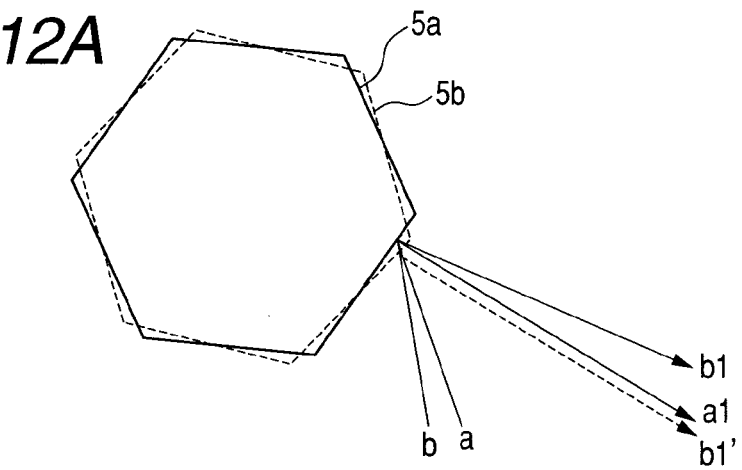
FIG. 12A is a main scanning sectional view illustrating how two light beams are reflected by the deflection surface according to Embodiment 2.

FIG. 12A is a main scanning sectional view illustrating how the principal ray of the two light beams a and b are reflected by the deflection surface 5a when the scanning end side (lower side of FIG. 10A) is scanned on the scanned surface 7-1. First, the light beam a emitted from the light emitting portion 1a is reflected by the deflection surface 5a (illustrated in full lines) and is reflected in the direction of the arrow a1 so as to be imaged on the scanned surface 7-1 with the fθ lens system 6 (not shown) disposed in the right direction. The light beam b emitted from the light emitting portion 1b at the same timing is reflected by the deflection surface 5a (illustrated in full lines) and is reflected in the direction of the arrow b1 so as to be imaged on the scanned surface 7-1 with the fθ lens system 6 (not shown) disposed in the right direction. The following two light beams a and b reflected by the deflection surface 5a (illustrated in full lines) at the same timing are reflected in different directions of arrows a1 and b1. Therefore, the light beams a and b emitted from the two light emitting portions 1a and 1b are imaged of spots at positions separated from each other in the main scanning direction on the scanned surface 7-1.

Therefore, the image data is sent at a timing shifted by the predetermined time δT (deflection surface 5b in this case is illustrated in dotted lines), so that the position in the main scanning direction at which the light beam a preceding in the main scanning direction forms an image on the scanned surface 7-1 coincides with the imaging position of the following light beam b in the main scanning direction. In this case, the light beam b that is emitted from the light emitting portion 1b and is reflected by the deflection surface 5b is reflected in the direction of the arrow b1' (in the same direction as the arrow a1) so as to be imaged on the scanned surface 7-1 at the same position in the main scanning direction as the light beam a preceding in the main scanning direction.

Figure 12B:
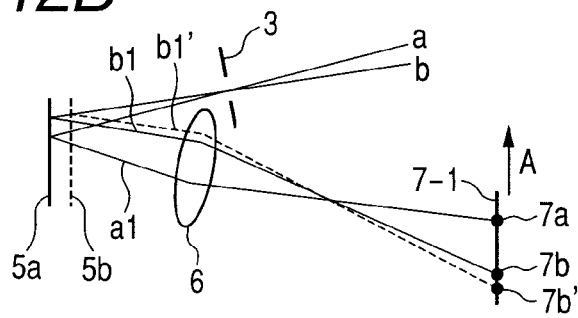
FIG. 12B is a diagram illustrating a change in the interval between the two scanning lines on the scanned surface according to Embodiment 2.

FIG. 12B is a sub scanning sectional view illustrating how the principal ray of the two light beams a and b are reflected by the deflection surface 5a when the scanning end side (lower side of FIG. 10A) is scanned on the scanned surface 7-1. Here, with reference to FIG. 12A, a reflection point of the light beam b emitted from the light emitting portion 1b reflected by the deflection surface 5b (illustrated in dotted lines) when the timing is shifted by the predetermined time δT is as follows. Specifically, it is understood that the reflection point of the light beam b is shifted in the direction approaching the fθ lens system 6 with respect to the reflection point at which the light beam a emitted from the light emitting portion 1a is reflected by the deflection surface 5a (illustrated in full lines).

In FIG. 12B, the light beams a and b emitted from the two light emitting portions 1a and 1b cross each other in the sub scanning section at the aperture stop 3 and are imaged like focal lines at positions separated from each other in the sub scanning direction by a predetermined interval on the deflection surface 5a. Then, the two light beams a and b reflected at the same timing by the deflection surface 5a (illustrated in full lines) are imaged on the scanned surface 7-1 with the fθ lens system 6 at the position 7a and the position 7b separated in the sub scanning direction by a predetermined interval. Here, the scanned surface 7-1 is moved in the direction indicated by the arrow A from down to up in the diagram as illustrated in FIG. 11A. The preceding light beam a first scans the scanned surface 7-1 in line, and then the following light beam b scans in line the lower side of the line scanned by the preceding light beam a.

A resolution obtained according to this Embodiment in the sub scanning direction is 600 DPI. Therefore, the interval between the imaging position 7a and the imaging position 7b is set to 25.4/600=0.04233 mm=42.33 µm. However, the light beam b reflected by the deflection surface 5b (illustrated in dotted lines) when the timing is shifted by the predetermined time δT so that the position in the main scanning direction at which the light beam a preceding in the main scanning direction forms an image on the scanned surface 7-1 coincides with the imaging position of the following light beam b in the main scanning direction becomes as follows. Specifically, because the deflection surface 5b in this case is shifted in the direction approaching the fθ lens system 6, the light beam b is deflectively scanned from the position shifted upward in the sub scanning direction on the deflection surface 5b and is reflected in the direction b1'. Therefore, an image is formed at the position 7b' shifted downward in the sub scanning direction with respect to the position 7b on the scanned surface 7-1. In other words, the interval between the scanning line on the scanned surface 7-1 is increased from the desired interval (42.33 µm) determined according to the resolution. As a result, as illustrated in FIG. 13A, on the scanned surface 7-1, the interval between the scanning lines formed by the light beams a and b emitted from the two light emitting portions 1a and 1b is reduced on the scanning start side while the interval is increased on the scanning end side, with respect to the desired interval.

Figure 13A:
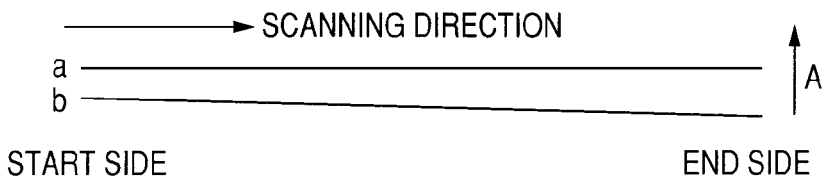
FIGS. 13A and 13B are diagrams each illustrating a change in the interval between two scanning lines on the scanned surface according to Embodiment 2.
Figure 13B:
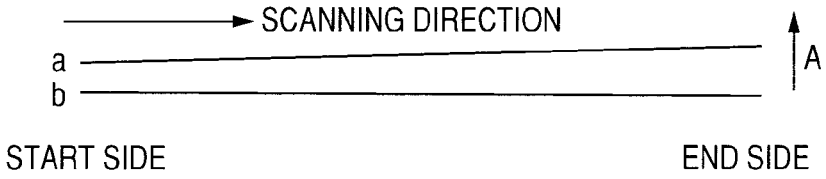

In FIG. 13A, the scanning line by the light beam b emitted from the light emitting portion 1b is drawn obliquely with respect to the scanning line by the light beam a emitted from the light emitting portion 1a. However, in actual assembly and adjustment of the light scanning apparatus, adjustments are made so that inclinations of both scanning lines are substantially in the same state. In other words, the second imaging lens 62 is rotated about the optical axis thereof in a plane perpendicular to the optical axis for adjustment so that the state of the scanning lines as illustrated in FIG. 13B is realized. Note that the scanned surface 7-1 is moved in the direction indicated by the arrow A from down to up in FIGS. 13A and 13B. Next, an optical path corresponding to the scanned surface 7-2 illustrated in FIG. 10B is described.

Figure 14A:
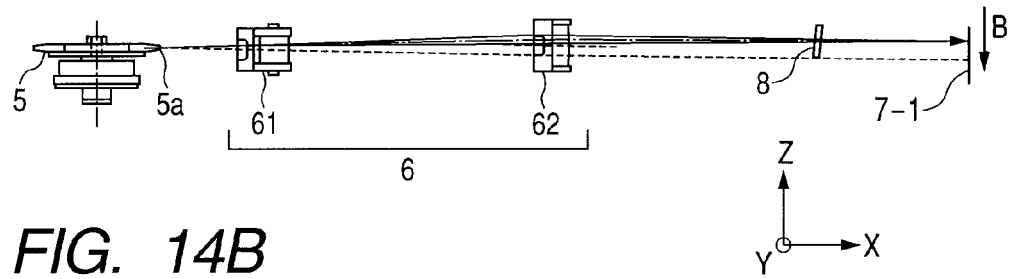
FIGS. 14A and 14B are sectional views of a main part in the sub scanning direction according to Embodiment 2.
Figure 14B:
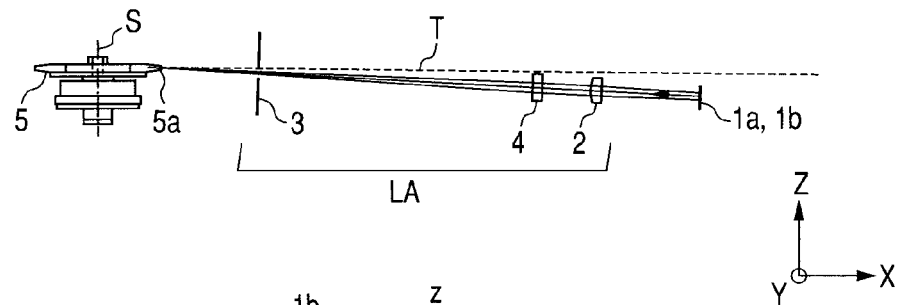

FIGS. 14A and 14B are schematic diagrams of a main part of an oblique-incidence optical system LA using the multi-beam light source, which is viewed from the sub scanning direction. FIG. 14A is a sectional view of a main part in the sub scanning direction of the optical path corresponding to the scanned surface 7-2 illustrated in FIG. 10B of the imaging optical system from the deflection surface 5a to the scanned surface 7. In FIG. 10B, folds in the sub scanning direction formed by the reflection mirrors are omitted in illustration. In this case, the optical path corresponding to the scanned surface 7-2 illustrated in FIG. 10B is extended in the state in which no fold is formed by the reflection mirrors. Then, the number of folds formed by the reflection mirrors in the optical path corresponding to the scanned surface 7-1 is two while the number of folds formed by the reflection mirrors in the optical path corresponding to the scanned surface 7-2 is one. Therefore, the surface of the scanned surface 7-2 is moved in the direction of the arrow B.

Figure 14C:
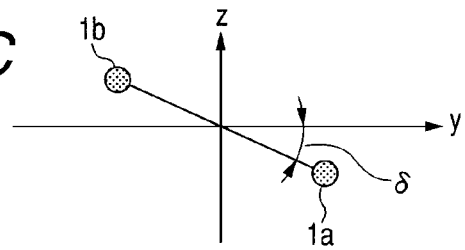
FIG. 14C is a diagram illustrating an arrangement of the two light emitting portions according to Embodiment 2.

FIG. 14B is a sectional view in the sub scanning direction of a main part corresponding to the scanned surface 7-2 illustrated in FIG. 10B of the incident optical system LA from the two light emitting portions 1a and 1b to the deflection surface 5a. The incident optical system LA from the two light emitting portions 1a and 1b to the deflection surface 5a is disposed obliquely with respect to a plane perpendicular to the rotation axis of the deflection surface (illustrated in dotted lines in the diagram) by an angle of 2.5 degrees downward. Further, the two light beams a and b emitted from the two light emitting portions 1a and 1b enter the deflection surface 5a obliquely from below at an angle of 2.5 degrees. The two light beams a and b deflectively scanned by the deflection surface 5a are reflected obliquely upward and are each condensed in a spot shape on the scanned surface 7-2 by the fθ lens system 6. As to an arrangement of the two light emitting portions 1a and 1b in the incident optical system LA corresponding to the scanned surface 7-2, the two light emitting portions 1a and 1b are arranged as illustrated in FIG. 14C when viewed from the direction of the arrow O illustrated in FIG. 10A in the case where the light beam a from the light emitting portion 1a forms an image at a preceding position on the scanned surface 7-2 in both the main direction and the sub scanning direction. Here, the light emitting portion 1a corresponds to the printing of the head line in the sub scanning direction on the scanned surface 7-2.

Figure 14D:
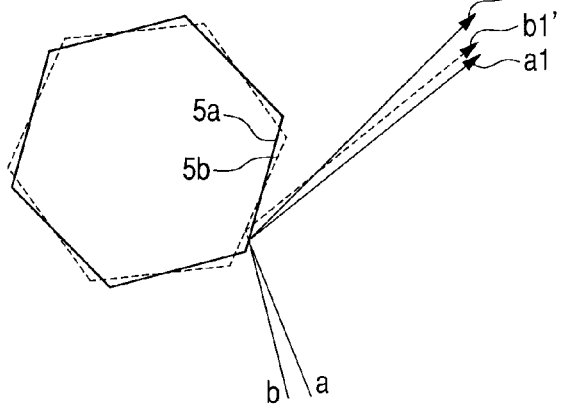
FIG. 14D is a diagram illustrating how two light beams are reflected by the deflection surface according to Embodiment 2.

Here, as illustrated in FIG. 14C, if the two light emitting portions 1a and 1b are arranged diagonally, the two light beams a and b enter the deflection surface 5a in the main scanning direction at different angles from each other. Therefore, reflection angles of the two light beams a and b after reflected by the deflection surface 5a are also different from each other. As a result, spots are imaged on the scanned surface 7-2 at positions separated from each other in the main scanning direction. Therefore, in the multi-beam light scanning apparatus having this structure, adjustments are made as described below. Specifically, the image data are transmitted at different timings shifted by the predetermined time δT so that a position in the main scanning direction at which a light beam emitted from one of the reference light emitting portions forms an image on the scanned surface 7-2 coincides with the other imaging position of a light beam emitted from the other light emitting portion in the main scanning direction. Note that the light beam emitted from the reference light emitting portion is usually a light beam emitted from a light emitting portion preceding in the scanning direction, which corresponds to the light emitting portion 1a of FIG. 14C. FIG. 14D is a main scanning sectional view illustrating how the principal ray of the two light beams a and b are reflected by the deflection surface 5a when the scanning start side (upper side of FIG. 10A) is scanned on the scanned surface 7-2.

First, the light beam a emitted from the light emitting portion 1a is reflected by the deflection surface 5a (illustrated in full lines) and is reflected in the direction of the arrow a1, so as to be imaged on the scanned surface 7-2 with the fθ lens system 6 (not shown) in the right direction. The light beam b emitted from the light emitting portion 1b at the same timing is reflected by the deflection surface 5a (illustrated in full lines) and is reflected in the direction of the arrow b1 so as to be imaged on the scanned surface 7-2 with the fθ lens system 6 (not shown) in the right direction. The two light beams a and b after reflected by the deflection surface 5a (illustrated in full lines) at the same timing are each reflected in the different directions of the arrows a1 and b1, respectively. Therefore, the light beams a and b emitted from the two light emitting portions 1a and 1b are each imaged in a spot shape at positions that are separated from each other in the main scanning direction on the scanned surface 7-2.

Therefore, the image data items are sent at different timings shifted by the predetermined time δT so that the position in the main scanning direction at which the light beam a preceding in the main scanning direction forms an image on the scanned surface 7-2 coincides with the imaging position in the main scanning direction of the following light beam b (deflection surface in this case is denoted by 5b and is illustrated in dotted lines). In this case, the light beam b emitted from the light emitting portion 1b and is reflected by the deflection surface 5b is reflected in the direction of the arrow b1' (same direction as the arrow a1) so as to be imaged at the same position in the main scanning direction as the preceding light beam a on the scanned surface 7-2 in the main scanning direction.

FIG. 14D is a sub scanning sectional view illustrating how the principal ray of the two light beams a and b are reflected by the deflection surface 5a when the scanning start side (upper side of FIG. 10A) is scanned on the scanned surface 7-1. Here, with reference to FIG. 14D, a reflection point of the light beam b emitted from the light emitting portion 1b reflected by the deflection surface 5b (illustrated in dotted lines) when the timing is shifted by the predetermined time δT is as follows. Specifically, it is understood that the reflection point of the light beam b is shifted in the direction separating away from the fθ lens system 6 with respect to the reflection point at which the light beam a emitted from the light emitting portion 1a is reflected by the deflection surface 5a (illustrated in full lines).

Figure 14E:
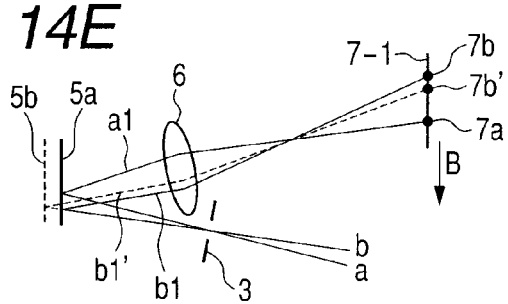
FIG. 14E is a diagram illustrating a change in the interval between two scanning lines on the scanned surface according to Embodiment 2.

In FIG. 14E, the light beams a and b emitted from the two light emitting portions 1a and 1b cross each other in the sub scanning section at the aperture stop 3 and are imaged like focal lines at positions separated from each other in the sub scanning direction by a predetermined interval on the deflection surface 5a. Then, the two light beams a and b reflected at the same timing by the deflection surface 5a (illustrated in full lines) are imaged on the scanned surface 7-2 with the fθ lens system 6 at the position 7a and the position 7b separated by a predetermined interval in the sub scanning direction. Here, the scanned surface 7-2 is moved in the direction indicated by the arrow B from up to down in the diagram as illustrated in FIG. 14A. The preceding light beam a first scans the scanned surface 7 in line, and then the following light beam b scans in line the lower side of the line scanned by the preceding light beam a.

A resolution obtained according to this Embodiment in the sub scanning direction is 600 DPI. Therefore, the interval between the imaging position 7a and the imaging position 7b is set to 25.4/600=0.04233 mm=42.33 μm. However, the light beam b reflected by the deflection surface 5b (illustrated in dotted lines) when the timing is shifted by the predetermined time δT so that the position in the main scanning direction at which the light beam a preceding in the main scanning direction forms an image on the scanned surface 7-2 coincides with the imaging position of the following light beam b in the main scanning direction becomes as follows. Specifically, because the deflection surface 5b in this case is shifted in the direction separating away from the fθ lens system 6, the light beam b is deflectively scanned from the position shifted upward in the sub scanning direction on the deflection surface 5b and is reflected in the direction b1'. Therefore, an image is formed at the position 7b' shifted downward in the sub scanning direction with respect to the position 7b on the scanned surface 7-2. In other words, the interval between the scanning line on the scanned surface 7-2 is decreased with respect to the desired interval (42.33 μm) determined according to the resolution.

Figure 15A:
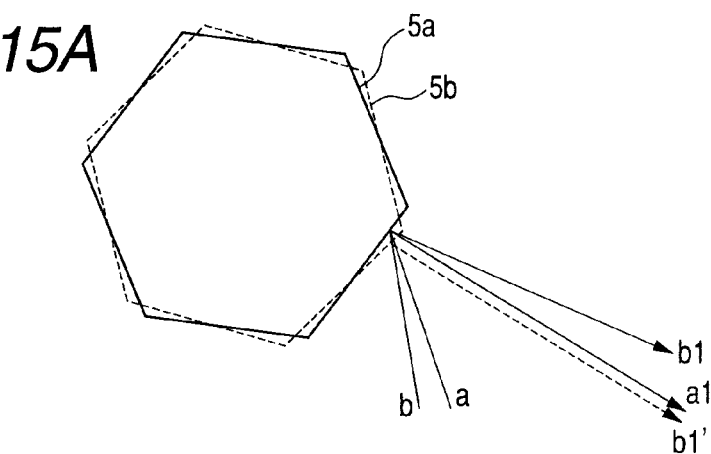
FIG. 15A is a main scanning sectional view illustrating how two light beams are reflected by the deflection surface according to Embodiment 2.

FIG. 15A is a main scanning sectional view illustrating how the principal ray of the two light beams a and b are reflected by the deflection surface 5a when the scanning end side (lower side of FIG. 10A) is scanned on the scanned surface 7-2. First, the light beam a emitted from the light emitting portion 1a is reflected by the deflection surface 5a (illustrated in full lines) and is reflected in the direction of the arrow a1 so as to be imaged on the scanned surface 7-2 with the fθ lens system 6 (not shown) disposed in the right direction. The light beam b emitted from the light emitting portion 1b at the same timing is reflected by the deflection surface 5a (illustrated in full lines) and is reflected in the direction of the arrow b1 so as to be imaged on the scanned surface 7-2 with the fθ lens system 6 (not shown) disposed in the right direction. The following two light beams a and b reflected by the deflection surface 5a (illustrated in full lines) at the same timing are reflected in different directions of arrows a1 and b1. Therefore, the light beams a and b emitted from the two light emitting portions 1a and 1b are imaged of spots at positions separated from each other in the main scanning direction on the scanned surface 7-1.

Figure 15B:
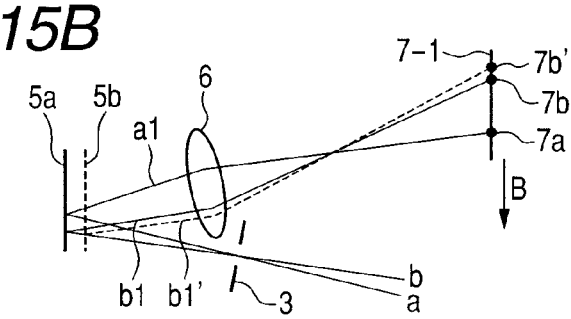
FIG. 15B is a diagram illustrating a change in the interval between two scanning lines on the scanned surface according to Embodiment 2.

Therefore, the image data is sent at a timing shifted by the predetermined time δT (deflection surface 5b in this case is illustrated in dotted lines), so that the position in the main scanning direction at which the light beam a preceding in the main scanning direction forms an image on the scanned surface 7-2 coincides with the imaging position of the following light beam b in the main scanning direction. In this case, the light beam b that is emitted from the light emitting portion 1b and is reflected by the deflection surface 5b is reflected in the direction of the arrow b1' (in the same direction as the arrow a1) so as to be imaged on the scanned surface 7-2 at the same position in the main scanning direction as the light beam a preceding in the main scanning direction. FIG. 15B is a sub scanning sectional view illustrating how the principal ray of the two light beams a and b are reflected by the deflection surface 5a when the scanning end side (lower side of FIG. 10A) is scanned on the scanned surface 7-2.

Here, with reference to FIG. 15A, a reflection point of the light beam b emitted from the light emitting portion 1b reflected by the deflection surface 5b (illustrated in dotted lines) when the timing is shifted by the predetermined time δT is as follows. Specifically, it is understood that the reflection point of the light beam b is shifted in the direction approaching the fθ lens system 6 with respect to the reflection point at which the light beam a emitted from the light emitting portion 1a is reflected by the deflection surface 5a (illustrated in full lines). In FIG. 15B, the light beams a and b emitted from the two light emitting portions 1a and 1b cross each other in the sub scanning section at the aperture stop 3 and are imaged like focal lines at positions separated from each other in the sub scanning direction by a predetermined interval on the deflection surface 5a.

Then, the two light beams a and b reflected at the same timing by the deflection surface 5a (illustrated in full lines) are imaged on the scanned surface 7-2 with the fθ lens system 6 at the position 7a and the position 7b separated in the sub scanning direction by a predetermined interval. Here, the scanned surface 7-2 is moved in the direction indicated by the arrow B from up to down in the diagram as illustrated in FIG. 14A. The preceding light beam a first scans the scanned surface 7-2 in line, and then the following light beam b scans in line the lower side of the line scanned by the preceding light beam a.

A resolution obtained according to this Embodiment in the sub scanning direction is 600 DPI. Therefore, the interval between the imaging position 7a and the imaging position 7b is set to 25.4/600=0.04233 mm=42.33 µm. However, the light beam b reflected by the deflection surface 5b (illustrated in dotted lines) when the timing is shifted by the predetermined time δT so that the position in the main scanning direction at which the light beam a preceding in the main scanning direction forms an image on the scanned surface 7-2 coincides with the imaging position of the following light beam b in the main scanning direction becomes as follows. Specifically, because the deflection surface 5b in this case is shifted in the direction approaching the fT lens system 6, the light beam b is deflectively scanned from the position shifted downward in the sub scanning direction on the deflection surface 5b and is reflected in the direction b1'.

Therefore, an image is formed at the position 7b' shifted upward in the sub scanning direction with respect to the position 7b on the scanned surface 7-2. In other words, the interval between the scanning line on the scanned surface 7-2 is increased with respect to the desired interval (42.33 µm) determined according to the resolution. As a result, as illustrated in FIG. 16A, on the scanned surface 7-2, the interval between the scanning lines formed by the light beams a and b emitted from the two light emitting portions 1a and 1b is reduced on the scanning start side while the interval is increased on the scanning end side, with respect to the desired interval.

Figure 16A:
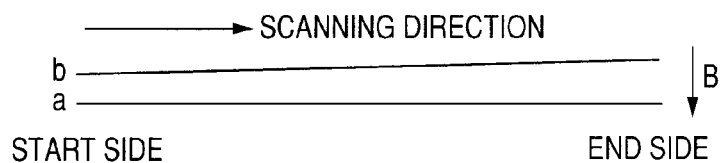
FIGS. 16A to 16C are diagrams each illustrating a change in the interval between two scanning lines on the scanned surface according to Embodiment 2.
Figure 16B:
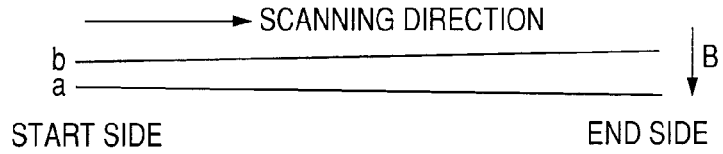

In FIG. 16A, the scanning line by the light beam b emitted from the light emitting portion 1b is drawn obliquely with respect to the scanning line by the light beam a emitted from the light emitting portion 1a. However, in actual assembly and adjustment of the light scanning apparatus, adjustments are made so that inclinations of both scanning lines are substantially in the same state. In other words, the second imaging lens 62 is rotated about the optical axis thereof in a plane perpendicular to the optical axis for adjustment so that the state of the scanning lines as illustrated in FIG. 16B is realized. Note that the scanned surface 7-2 is moved in the direction indicated by the arrow B from up to down in FIGS. 16A and 16B.

Figure 16C:
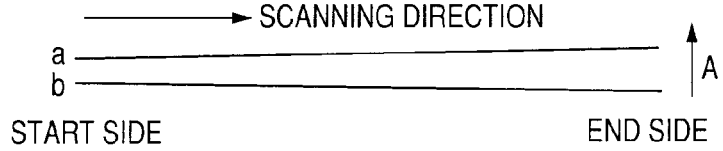

Here, the scanned surface 7-2 is moved in the direction indicated by the arrow B from up to down in the diagram as illustrated in FIG. 14A. In contrast, the scanned surface 7-1 is moved in the direction indicated by the arrow A from down to up in the diagram as illustrated in FIG. 11A. Therefore, it is understood that if the two scanning lines on the scanned surface 7-2 illustrated in FIG. 16B are aligned in the movement direction on the scanned surface 7-1 that is the same as that illustrated in FIG. 13B, the two scanning lines on the scanned surface 7-2 becomes as illustrated in FIG. 16C, so as to completely coincide with the scanning lines on the scanned surface 7-1. In this Embodiment, the number of reflection mirrors is different between the optical path to the scanned surface 7-1 and the optical path to the scanned surface 7-2, so that the number of folds is set to an even number in one of the optical paths while the number is set to an odd number in the other optical path. Thus, a difference between the numbers of folds in both of the optical paths is set to an odd number. In this case, the light emitting portion for starting to write the image data of the head line on the plurality of scanned surfaces is set as follows.

Specifically, the light emitting portions 1a and 1a for the color K and the color C corresponding to the printing of the head line in the sub scanning direction are the same in the sub scanning direction. As a result, the scanning line on the scanned surface 7-1 may coincide with the scanning line on the scanned surface 7-2 in the sub scanning direction in the entire scanning region, so that a high definition image without a color shift may be output. Further, in this Embodiment, without limiting to the structure described above, if the number of folds in one of the optical paths is set to an even number (number of the reflection mirrors is set to an even number), and if the number of folds in the other optical path is set to an odd number (number of the reflection mirrors is set to an odd number), the same effect as the Embodiment described above may be obtained. Further, in Embodiment 1 and Embodiment 2 described above, description has been given of a case where the light source unit including a monolithic semiconductor laser or the like, which includes the two light emitting portions, is employed, but the present invention is not limited to this structure. As long as two or more light emitting portions are employed, the same effect may be obtained.

Further, in this Embodiment, the light source unit disposed corresponding to each of the plurality of incident optical systems includes two light emitting portions, but this structure should not be interpreted as a limitation. For instance, a plurality of light source units each of which includes at least one light emitting portion may be disposed corresponding to each of the plurality of incident optical systems. In this case, at least one light beam emitted from a plurality of light source units should be combined by a beam combination unit that emits the light beam in the same direction, so as to guide the light beam to the deflection surface of the optical deflector. Further, in this case, the same effect as Embodiment 1 described above may be obtained by the following structure.

Specifically, among the optical paths of light beams entering the surface of the rotational polygon mirror perpendicular to the rotation axis S obliquely from above direction, the light source unit corresponding to printing of the head line in the sub scanning direction is set to the light source unit 1. In this case, the light source units 1 and 1 should be used differently in the sub scanning direction, so that the same effect as Embodiment 1 described above may be obtained. Thus, in this Embodiment, color shift of the image printed on the photosensitive member corresponding to a plurality of colors as described above, in particular, color shift in the sub scanning direction that is conspicuous at the end portion in the main scanning direction may be corrected appropriately.

In the Embodiment 2, as described above, a difference between a first number of folds of the light beam entering the surface perpendicular to the rotation axis of the rotational polygon mirror in the sub scanning section from the obliquely upward direction and being reflected by the reflection mirrors and a second number of folds of the light beam entering the surface perpendicular to the rotation axis of the rotational polygon mirror in the sub scanning section from the obliquely downward direction and being reflected by the reflection mirrors is an odd number.

In addition, when among a plurality of light emitting portions of the plurality of light source units that emit the light beams entering the surface perpendicular to the rotation axis of the rotational polygon mirror in the sub scanning section from the obliquely upward direction, a first light emitting portion is defined to correspond to printing of a first scanning line at a head in the sub scanning direction, while among a plurality of light emitting portions of the plurality of light source units that emit the light beams entering the surface perpendicular to the rotation axis of the rotational polygon mirror in the sub scanning section from the obliquely downward direction, a second light emitting portion is defined to correspond to printing of a second scanning line at the head in the sub scanning direction, a height of the first light emitting portion in the sub scanning direction on the plurality of light source units is the same as a height of the second light emitting portion in the sub scanning direction on the plurality of light source units.

[Embodiment 3]

Figure 17A:
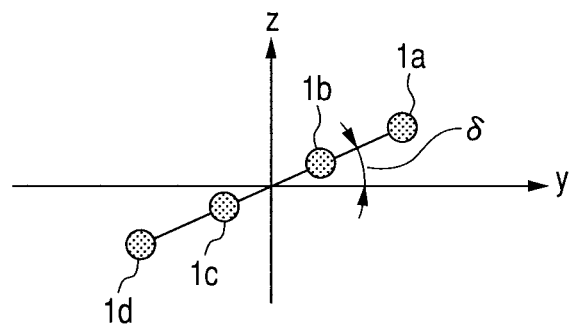
FIG. 17A is a diagram illustrating an arrangement of four light emitting portions according to Embodiment 3.

Embodiments 1 and 2 of the present invention described above use the multi-beam light source unit including two light emitting portions, while Embodiment 3 of the present invention uses the multi-beam light source including four light emitting portions as the light source units. FIG. 17A illustrates an arrangement of the four light emitting portions 1a, 1b, 1c, and 1d in the incident optical system corresponding to the scanned surface 7 of the color C of FIG. 1B. Further, this arrangement is an arrangement viewed from the direction of the arrow O of FIG. 1B. Here, the light emitting portion 1a corresponds to the printing of the head line on the scanned surface 7. In Embodiment 1, as described above with reference to FIGS. 4C and 4D, on the scanned surface 7 of the color C, the interval between the scanning lines formed by the light beams emitted from the two light emitting portions 1a and 1b is larger than a desired interval on the scanning start side while the interval is smaller than the desired interval on the scanning end side. Similarly to this, it would be easily understood that the same phenomenon occurs in Embodiment 3 in which the four light emitting portions 1a, 1b, 1c, and 1d are used.

Figure 17B:
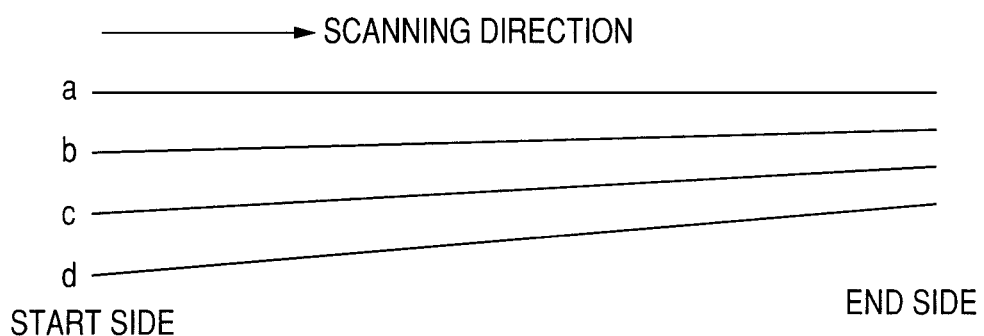
FIGS. 17B and 17C are diagrams each illustrating a change in intervals among four scanning lines on a scanned surface according to Embodiment 3.

FIG. 17B illustrates how the scanning lines are formed by the light beams a, b, c, and d emitted from the four light emitting portions 1a, 1b, 1c, and 1d on the scanned surface 7 of the color C. On the scanned surface 7 of the color C, the intervals among the scanning lines formed by the light beams emitted from the four light emitting portions 1a, 1b, 1c, and 1d each are larger than a desired interval on the scanning start side while the intervals are each smaller than the desired interval on the scanning end side. In FIG. 17B, the scanning lines formed by the light beams emitted from the light emitting portions 1b, 1c, and 1d are drawn obliquely with respect to the scanning line by the light beam emitted from the light emitting portion 1a.

Figure 17C:
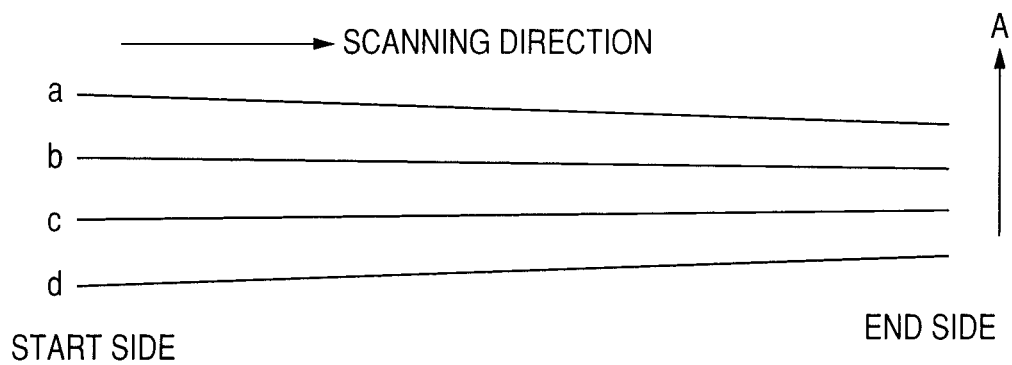
Figure 18A:
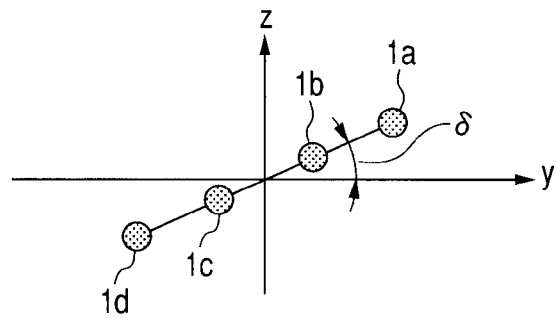
FIG. 18A is a diagram illustrating an arrangement of the four light emitting portions according to Embodiment 3.

However, in actual assembly and adjustment of the light scanning apparatus, adjustments are made by rotating the second lens 62 of the fθ lens system 6 about the optical axis thereof in a plane perpendicular to the optical axis, so that inclinations of all the scanning lines are substantially in the same state, that is, so that the state of the scanning lines as illustrated in FIG. 17C is realized. Note that the scanned surface 7 is moved in the direction indicated by the arrow A from down to up in FIG. 17C. Next, an arrangement of the four light emitting portions 1a, 1b, 1c, and 1d in the incident optical system corresponding to the scanned surface 7 of the color K of FIG. 1B is illustrated in FIG. 18A. Note that this arrangement is an arrangement viewed from the direction of the arrow O of FIG. 1B. Here, the light emitting portion 1a corresponds to printing of the head line on the scanned surface 7.

Figure 18B:
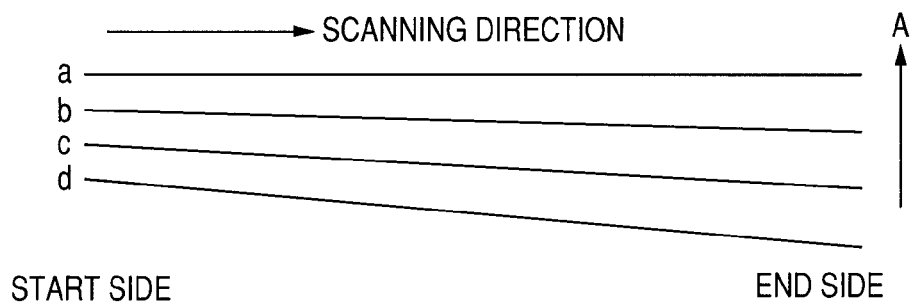
FIGS. 18B, 18C and 18D are diagrams each illustrating a change in intervals among four scanning lines on the scanned surface according to Embodiment 3.

As described above in Embodiment 1 with reference to FIGS. 7A and 7B, on the scanned surface 7 of the color K, the interval between the scanning lines formed by the light beams emitted from the two light emitting portions 1a and 1b is smaller than a desired interval on the scanning start side while the interval is larger than the desired interval on the scanning end side. Similarly to this, it would be easily understood that the same phenomenon occurs in Embodiment 3 in which the four light emitting portions 1a, 1b, 1c, and 1d are used. FIG. 18B illustrates how the scanning lines are formed by the light beams a, b, c, and d emitted from the four light emitting portions 1a, 1b, 1c, and 1d, on the scanned surface 7 of the color K. On the scanned surface 7 of the color K, the intervals among the scanning lines formed by the light beams emitted from the four light emitting portions 1a, 1b, 1c, and 1d are each smaller than a desired interval on the scanning start side while the intervals are each larger than the desired interval on the scanning end side.

Figure 18C:
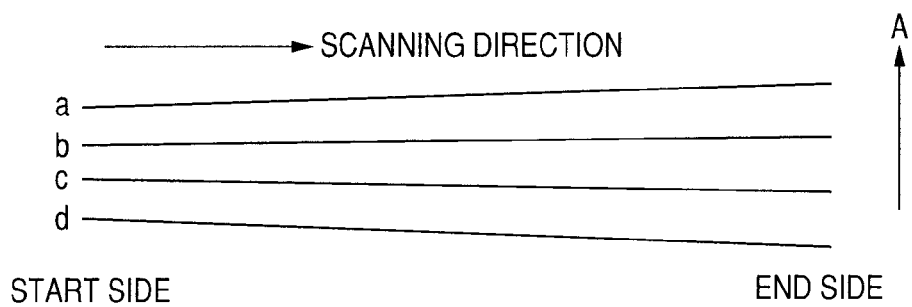

In FIG. 18B, the scanning lines formed by the light beams emitted from the light emitting portions 1b, 1c, and 1d are drawn obliquely with respect to the scanning line by the light beam emitted from the light emitting portion 1a. However, in actual assembly and adjustment of the light scanning apparatus, adjustments are made by rotating the second imaging lens 62 about the optical axis thereof in a plane perpendicular to the optical axis so that inclinations of all the scanning lines are substantially in the same state, that is, so that so that the state of the scanning lines as illustrated in FIG. 18C is realized. Note that the scanned surface 7 is moved in the direction indicated by the arrow A from down to up in FIGS. 18B and 18C. On the scanned surface 7 of the color K illustrated in FIG. 16C, the intervals among the scanning lines formed by the light beams emitted from the four light emitting portions 1a, 1b, 1c, and 1d are each smaller than a desired interval on the scanning start side while the intervals are each larger than the desired interval on the scanning end side.

Figure 18D:
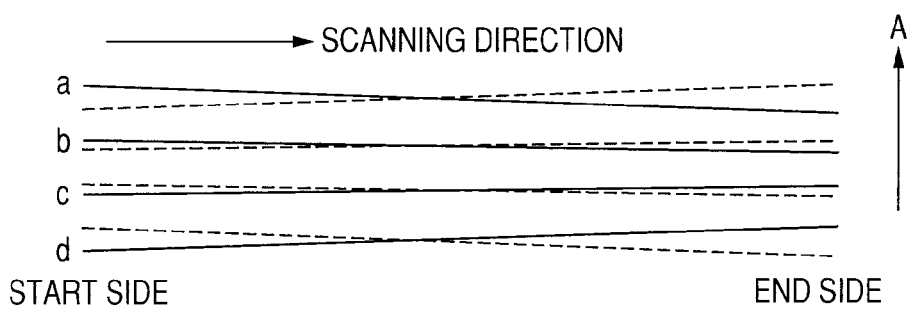

As a result, the intervals according to this Embodiment have the opposite relationship with the intervals among the scanning lines formed by the light beams emitted from the four light emitting portions 1a, 1b, 1c, and 1d on the scanned surface 7 of the color C illustrated in FIG. 17C. In other words, on the scanned surface 7 corresponding to the color C, the scanning lines as illustrated in FIG. 17C are continuously drawn in the sub scanning direction. On the scanned surface 7 corresponding to the color K, the scanning lines as illustrated in FIG. 18C are continuously drawn in the sub scanning direction. As a result, as illustrated in FIG. 18D, the color C and the color K do not coincide except for the middle portion in the main scanning direction, so that a color shift in the sub scanning direction is observed. Further, in FIG. 18D, the scanning lines on the scanned surface 7 corresponding to the color C are illustrated in full lines while the scanning lines on the scanned surface 7 corresponding to the color K are illustrated in dotted lines.

Figure 19A:
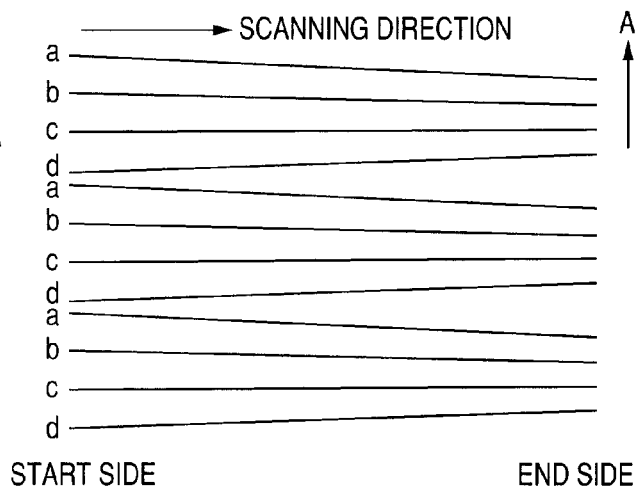
FIGS. 19A, 19B and 19C are diagrams each illustrating changes in intervals among four scanning lines on the scanned surface according to Embodiment 3.

Therefore, in Embodiment 3, the light emitting portion for starting to write the image data of the head line on the plurality of scanned surfaces is set as follows. Specifically, the light emitting portions for the color K and the color C corresponding to the printing of the head line in the sub scanning direction are set to be different from each other in the sub scanning direction. Hereinafter, specific description is given. FIG. 19A illustrates an actual output image in the case where the scanning line on the scanned surface 7 corresponding to the color C illustrated in FIG. 17C is printed repeatedly and continuously in the sub scanning direction. In this case, the image data of the head line in the sub scanning direction is printed by using the light emitting portion 1a corresponding to the printing of the head line in the sub scanning direction. Next, the scanning and the printing are performed by the light emitting portion 1b, the light emitting portion 1c, and the light emitting portion 1d in this order.

Figure 19B:
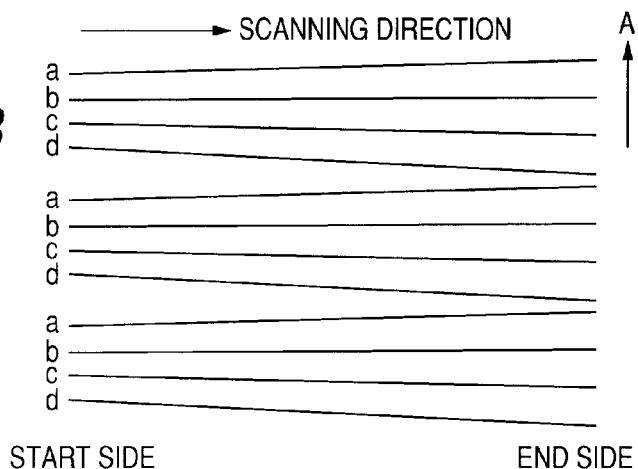
Figure 19C:
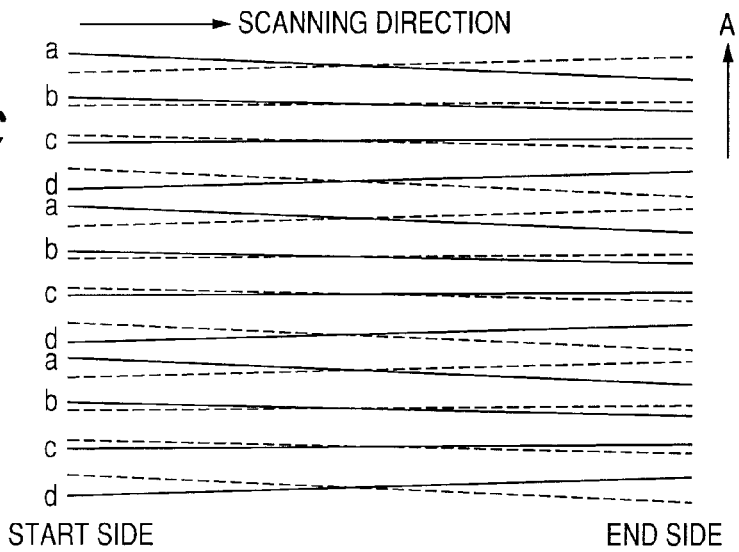
Figure 20A:
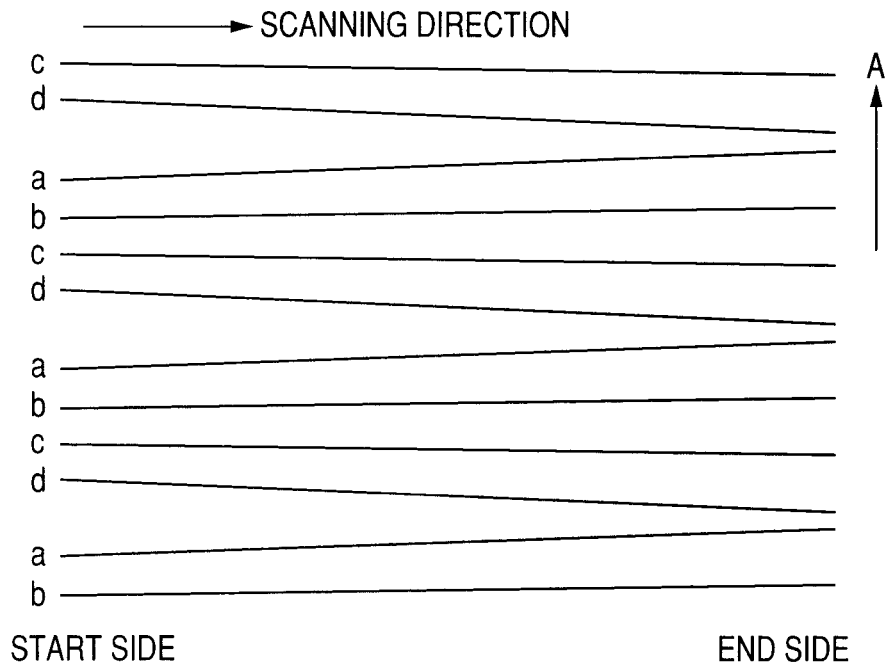
FIGS. 20A and 20B are diagrams each illustrating changes in intervals among four scanning lines on the scanned surface according to Embodiment 3.

Next, FIG. 19B similarly illustrates an actual output image in the case where the scanning line on the scanned surface 7 corresponding to the color K illustrated in FIG. 18C is printed repeatedly and continuously in the sub scanning direction. Even in this case, the image data of the head line in the sub scanning direction indicates an output image in the case where the printing is performed by the light emitting portion 1a corresponding to the printing of the head line in the sub scanning direction. However, it is apparent from FIGS. 19A and 19B that if the printing is normally performed in this state, the color C and the color K do not coincide with each other except for the middle portion in the main scanning direction so that a color shift in the sub scanning direction is observed, which is illustrated in FIG. 19C. Therefore, in Embodiment of the present invention, when printing an image corresponding to the color K, print control is performed so that the image data of the head line in the sub scanning direction is printed by using the light emitting portion 1c, rather than the light emitting portion 1a corresponding to printing of the head line in the sub scanning direction. Next, the scanning and the printing are performed by the light emitting portion 1d, the light emitting portion 1a, and the light emitting portion 1b in this order. The image corresponding to the color K output in this way is illustrated in FIG. 20A.

Figure 20B:
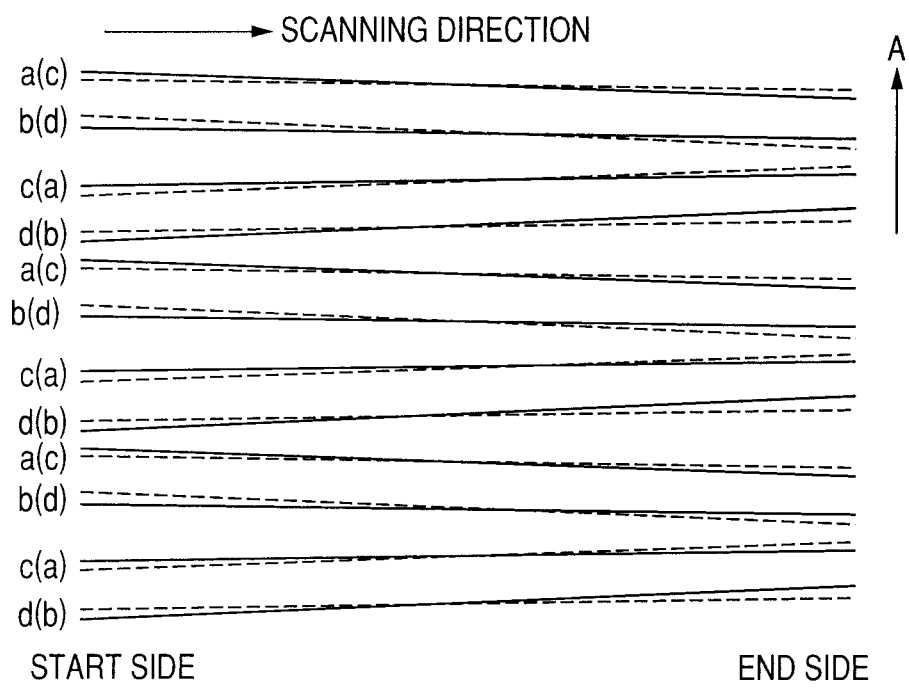

An actual output image in the case where the scanning line on the scanned surface 7 corresponding to the color C illustrated in FIG. 19A is continuously printed in the sub scanning direction is set as an output image A. Further, the actual output image in the case where the scanning line on the scanned surface 7 corresponding to the color K in the case where the scanning and the printing are performed by the light emitting portions 1c, 1d, 1a, and 1b in this order, which are illustrated in FIG. 20A, is printed repeatedly and continuously in the sub scanning direction is set as an output image B. In this case, how the output image A and the output image B are overlaid on each other is illustrated in FIG. 20B. Here, the scanning lines on the scanned surface 7 corresponding to the color C are illustrated in full lines, while the scanning lines on the scanned surface 7 corresponding to the color K are illustrated in dotted lines.

Compared with the color shift illustrated in FIG. 19C, it is understood that the color shift illustrated in FIG. 20B is smaller. In Embodiment 1 described above (which uses two light emitting portions), the light emitting portions for the color K and the color C corresponding to the printing of the head line in the sub scanning direction are set to be different from each other in the sub scanning direction. Thus, the scanning line on the scanned surface 7 corresponding to the color C and the scanning line on the scanned surface 7 corresponding to the color K may coincide with each other in the sub scanning direction in the entire scanning region. However, in Embodiment 3, four light emitting portions are used. Therefore, if the light emitting portions for the color K and the color C corresponding to the printing of the head line in the sub scanning direction are set different from each other in the sub scanning direction for use as illustrated in FIG. 20B, the scanning lines corresponding to the color C and the color K may not coincide with each other in the entire scanning region as illustrated in Embodiment 1. However, compared with the state illustrated in FIG. 19C, it is understood that Embodiment 3 has an effect of reducing the color shift.

In Embodiment 3 of the present invention, the multi-beam light source including four light emitting portions is used as the light source unit, and the incident optical system is disposed so that a plurality of light beams enter from above and below in the sub scanning direction at a predetermined angle. In the light scanning apparatus having this structure, if a difference of the number of folds in the optical path in the sub scanning direction from the optical deflector to the scanned surface between the incident optical system corresponding to the light beam entering from above direction and that corresponding to the light beam entering from below is an even number, it is set as follows. Specifically, as described above, the light emitting portions for the color K and the color C corresponding to the printing of the head line in the sub scanning direction are set to be different from each other in the sub scanning direction. Thus, color shifts between the sub scanning direction of the scanning line on the scanned surface 7 corresponding to the color C and the scanning line on the scanned surface 7 corresponding to the color K may be reduced.

In Embodiments 1 and 2 of the present invention, the light source unit including the monolithic semiconductor laser or the like, which includes two light emitting portions, is used. In addition, in Embodiment 3 of the present invention, the light source unit including the monolithic semiconductor laser or the like, which includes four light emitting portions, is used. However, the present invention is not limited to the above-mentioned structure. The same effect may be obtained if three or four or more light emitting portions are used. Further, the light source unit may include a beam combination unit that emits at least one light beam emitted from a plurality of light source units including at least one light emitting portion, substantially in the same direction.

Specifically, it is preferable that each of the plurality of light emitting portions includes a beam combination unit which emits the plurality of light beams emitted from the plurality of light emitting portions constituting the light source unit in the same direction.

It is preferable for example that each of the plurality of light source units comprises two of a monolithic multi-beam semiconductor laser including one light emitting portion, and two of light beams are superimposed by the deflection beam splitter as the beam combination unit.

[Embodiment 4]

Figure 21A:
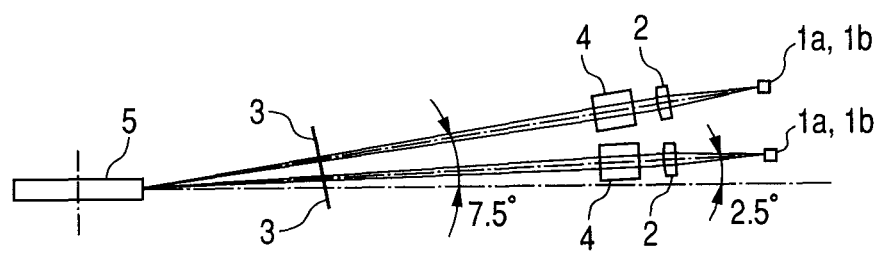
FIG. 21A is a sectional view of a main part in a sub scanning direction of an incident optical system according to Embodiment 4.

Embodiments 1, 2 and 3 of the present invention described above have the structure in which the incident optical system is disposed so that a plurality of light beams enter the deflection surface from above and below in the sub scanning direction (obliquely from above and below directions with respect to a surface perpendicular to the rotation axis of the rotational polygon mirror) at a predetermined angle. Embodiment 4 of the present invention has a structure in which a plurality of incident optical systems are disposed at a predetermined angle in the same direction in the sub scanning direction (upper direction in the sub scanning direction in Embodiment 4). FIG. 21A is a sectional view of a main part in the sub scanning direction of the light scanning apparatus using the oblique-incidence optical system using the multi-beam light source unit according to Embodiment 4 of the present invention, which is applied to the image forming apparatus, from the plurality of light emitting portions 1a and 1b to the optical deflector 5.

In FIG. 21A, the plurality of light beams enter the rotational polygon mirror 5 at angles of 2.5 degrees and 7.5 degrees from an upper direction in the sub scanning direction. The plurality of light beams entering from the upper direction in the sub scanning direction at angles of 2.5 degrees and 7.5 degrees are each condensed in a spot shape on the photosensitive member 7 corresponding to each of the colors Y, M, C, and K via the optical paths of the folds which includes two folds in the sub scanning direction in the entire optical path as illustrated in FIG. 1B. Here, the incident optical system for the light beam entering at an angle of 2.5 degrees from the upper direction as illustrated in FIG. 21A corresponds to the photosensitive member 7 of the color C, and the incident optical system for the light beam entering at an angle of 7.5 degrees from the upper direction corresponds to the photosensitive member 7 of the color K.

Figure 21B:
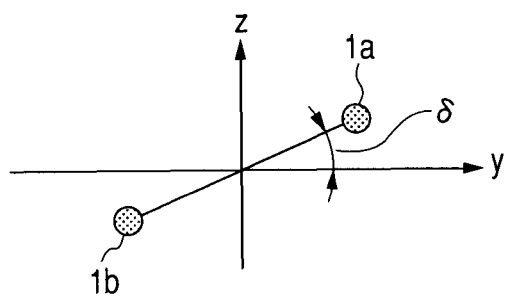
FIG. 21B is a diagram illustrating an arrangement of two light emitting portions according to Embodiment 4.

FIG. 21B illustrates an arrangement of the light emitting portions 1a and 1b in the incident optical system corresponding to the photosensitive member 7 of the color C and the photosensitive member 7 of the color K. Because the number of folds in the sub scanning direction is two in both the optical path corresponding to the photosensitive member 7 of the color C and the optical path corresponding to the photosensitive member 7 of the color K, the surfaces of the photosensitive member 7 of the color C and the photosensitive member 7 of the color K are both moved in the direction of the arrow A illustrated in FIG. 5A. Therefore, if the light beam emitted from the light emitting portion 1a forms an image on the photosensitive member 7 at a preceding position in both the main scanning direction and the sub scanning direction, the arrangement viewed from the direction of the arrow O of FIG. 1A is set as illustrated in FIG. 21B. Here, the light emitting portion 1a corresponds to the printing of the head line on the photosensitive member 7. From the description in Embodiment 1 about the scanning line on the photosensitive member 7 corresponding to the optical path for the light beam obliquely entering the deflection surface 5a at a predetermined angle from the upper direction (FIGS. 7A and 7B), the followings are understood.

Figure 21C:
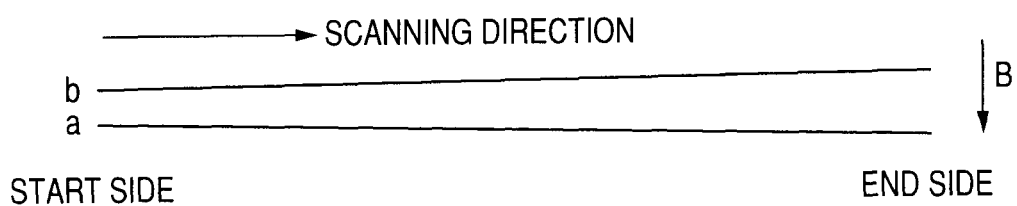
FIG. 21C is a diagram illustrating a change in the interval between two scanning lines on a scanned surface according to Embodiment 4.
Figure 22A:
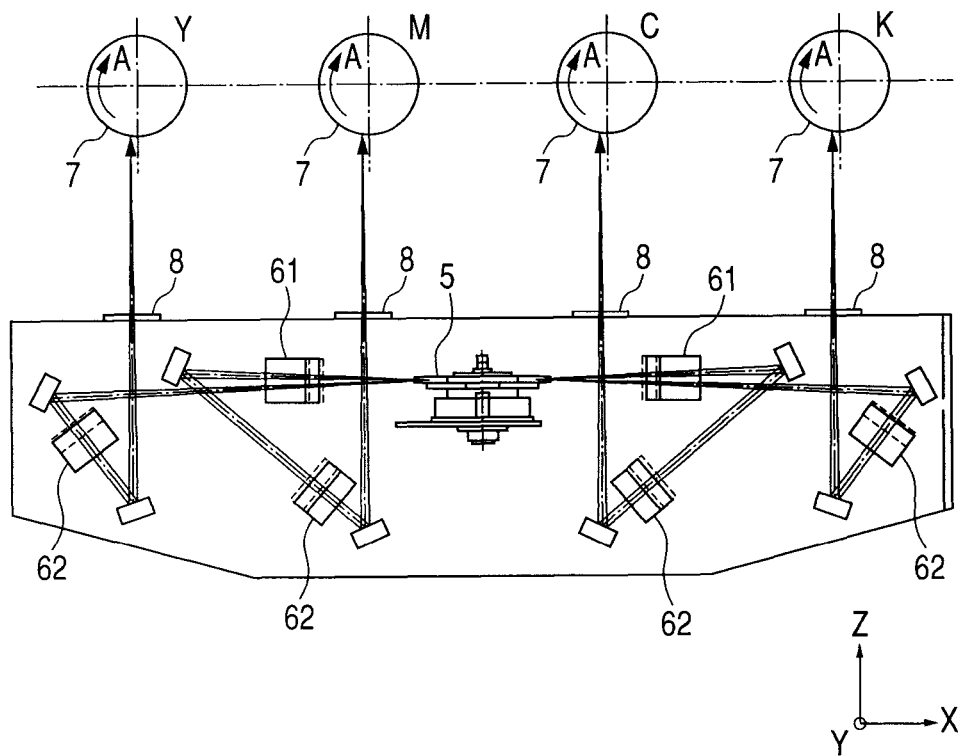
FIG. 22A is a diagram illustrating a general structure of a conventional multi-beam light scanning apparatus.
Figure 22B:
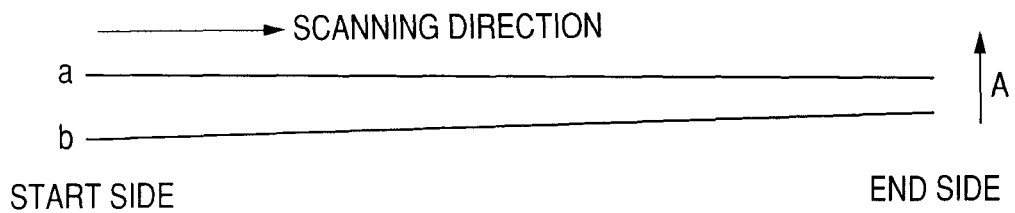
FIGS. 22B and 22C are diagrams each illustrating a change in the interval between two scanning lines on a scanned surface of the apparatus.
Figure 22C:
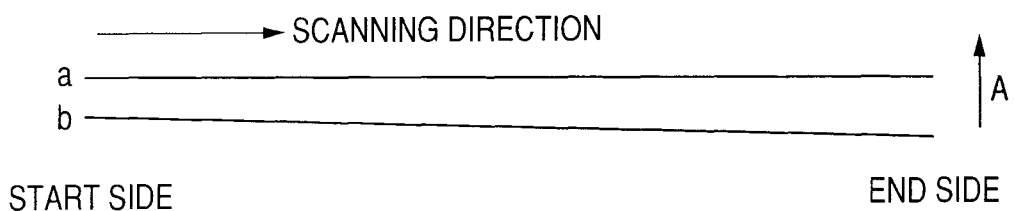

Specifically, on the photosensitive member 7 of the color C and the photosensitive member 7 of the color K, the interval between the scanning lines formed by the light beams emitted from the two light emitting portions 1a and 1b is smaller than a desired interval on the scanning start side, while the interval is larger than the desired interval on the scanning end side. FIG. 21C illustrates how the scanning lines are formed by the light beams a and b emitted from the two light emitting portions 1a and 1b on the photosensitive member 7 of the color C and the photosensitive member 7 of the color K. In Embodiment 4, a plurality of light beams enter the rotational polygon mirror 5 both from the upper direction in the sub scanning direction at angles of 2.5 degrees and 7.5 degrees. Therefore, as to the scanning lines on the photosensitive member 7 of the color C and the photosensitive member 7 of the color K, the interval between the scanning lines formed by the light beams emitted from the two light emitting portions 1a and 1b is smaller than a desired interval on the scanning start side, while the interval is larger than the desired interval on the scanning end side.

Therefore, the scanning line on the scanned surface 7 corresponding to the color C and the scanning line on the scanned surface 7 corresponding to the color K may coincide with each other in the sub scanning direction in the entire scanning region, so that a high definition image without a color shift may be output. In Embodiment 4, as described above, the incident optical system is disposed so that a plurality of light beams enter the rotational polygon mirror 5 from the upper direction at a predetermined angle (2.5 degrees and 7.5 degrees) in the sub scanning direction as illustrated in FIG. 21A. In this structure, if a difference of the number of folds in the optical path in the sub scanning direction from the optical deflector to the scanned surface between the incident optical system for the light beam entering from one upper direction (at 2.5 degrees) and that for the light beam entering from the other upper direction (at 7.5 degrees) is an even number, it is set as follows.

Specifically, the light emitting portions 1a and 1a for the color K and the color C corresponding to the printing of the head line in the sub scanning direction are set in the same way in the sub scanning direction. Thus, the scanning line on the scanned surface 7 corresponding to the color C and the scanning line on the scanned surface 7 corresponding to the color K may coincide with each other in the sub scanning direction in the entire scanning region, so that a high definition image without a color shift may be output.

Specifically, all the plurality of incident optical systems allow the plurality of light beams to enter the deflection surface of the rotational polygon mirror at a finite angle from one of an obliquely upward direction and an obliquely downward direction with respect to a surface perpendicular to a rotation axis of a rotational polygon mirror in the sub scanning section.

Further, it is preferable that each of the plurality of scanning units includes reflection mirrors in an optical path between the deflection surface of the rotational polygon mirror and the scanned surface, and that a difference between a first number of folds of the plurality of light beams deflectively scanned by the deflection surface of the rotational polygon mirror of one scanning unit of the plurality of scanning units being reflected by the reflection mirrors and a second number of folds of the plurality of light beams deflectively scanned by the deflection surface of the rotational polygon mirror of another scanning unit of the plurality of scanning units being reflected by the reflection mirrors is an even number.

In addition, it is also preferable that when among a plurality of light emitting portions of the plurality of light source units that emit the plurality of light beams deflectively scanned by the deflection surface of the rotational polygon mirror of the one scanning unit of the plurality of scanning units, a first light emitting portion is defined to correspond to printing of a first scanning line at a head in the sub scanning direction, while among a plurality of light emitting portions of the plurality of light source units that emit the plurality of light beams deflectively scanned by the deflection surface of the rotational polygon mirror of the another scanning unit of the plurality of scanning units, a second light emitting portion is defined to correspond to printing of a second scanning line at the head in the sub scanning direction, a height of the first light emitting portion in the sub scanning direction on the plurality of light source units is the same as a height of the second light emitting portion in the sub scanning direction on the plurality of light source units.

In Embodiment 4, a difference of the number of folds in the optical path between the plurality of light beams entering at angles of 2.5 degrees and 7.5 degrees from the upper direction in the sub scanning direction is an odd number, it is easily understood from the above description. In other words, in this case, the light emitting portions 1a and 1a for the color K (upper direction at 2.5 degrees) and the color C (upper direction at 7.5 degrees) corresponding to the printing of the head line in the sub scanning direction should be different from each other in the sub scanning direction.

Specifically, all the plurality of incident optical systems allow the plurality of light beams to enter the deflection surface of the rotational polygon mirror at a finite angle from one of an obliquely upward direction and an obliquely downward direction with respect to a surface perpendicular to a rotation axis of the rotational polygon mirror in the sub scanning section.

Further, it is preferable that each of the plurality of scanning units includes reflection mirrors in an optical path between the deflection surface of the rotational polygon mirror and the scanned surface, and that a difference between a first number of folds of the plurality of light beams deflectively scanned by the deflection surface of the rotational polygon mirror of one scanning unit of the plurality of scanning units being reflected by the reflection mirrors and a second number of folds of the plurality of light beams deflectively scanned by the deflection surface of the rotational polygon mirror of another scanning unit of the plurality of scanning units being reflected by the reflection mirrors is an odd number.

In addition, it is also preferable that when among the plurality of light emitting portions of the plurality of light source units that emit the plurality of light beams deflectively scanned by the deflection surface of the rotational polygon mirror of the one scanning unit of the plurality of scanning units, a first light emitting portion is defined to correspond to printing of a first scanning line at a head in the sub scanning direction, while among a plurality of light emitting portions of the plurality of light source units that emit the plurality of light beams deflectively scanned by the deflection surface of the rotational polygon mirror of the another scanning unit of the plurality of scanning units, a second light emitting portion is defined to correspond to printing of a second scanning line at the head in the sub scanning direction, a height of the first light emitting portion in the sub scanning direction on a plurality of light source units is different from a height of the second light emitting portion in the sub scanning direction on a plurality of light source units.

Further, Embodiment 4 has the structure in which the plurality of incident optical systems are disposed at predetermined angles from the upper direction in the sub scanning direction, but this structure should not be interpreted as a limitation. It is possible to adopt another structure in which the plurality of incident optical systems are disposed from below direction at a predetermined angle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-211550, filed Sep. 14, 2009, which is hereby incorporated by reference herein in its entirety.

What is claimed is:

1. A multi-beam light scanning apparatus comprising a plurality of scanning units each including:
   a light source unit including a plurality of light emitting portions arranged at intervals in a main scanning direction and in a sub scanning direction;
   an incident optical system which allows a plurality of light beams emitted from the plurality of light emitting portions to enter a deflection surface of a rotational polygon mirror; and
   an imaging optical system for condensing a plurality of light beams deflected by the deflection surface of the rotational polygon mirror on a scanned surface; and
   at least one reflection mirror in an optical path between the deflection surface of the rotational polygon mirror and the scanned surface, where:
   the deflection surface of the rotational polygon mirror and the scanned surface satisfy a conjugate relationship in a sub scanning section;
   the incident optical system in each of the plurality of scanning units allows a plurality of light beams to enter the deflection surface of the rotational polygon mirror at a finite angle from one of an obliquely upward direction and an obliquely downward direction with respect to a surface perpendicular to a rotation axis of the rotational polygon mirror in the sub scanning section;
   a difference between a first number of folds of the plurality of light beams entering the deflection surface of the rotational polygon mirror from the obliquely upward direction and being reflected by the at least one reflection mirror and a second number of folds of the plurality of light beams entering the deflection surface of the rotational polygon mirror from the obliquely downward direction and being reflected by the at least one reflection mirror is an even number;
   among a plurality of light emitting portions of the scanning unit that emit the light beams entering the deflection surface of the rotational polygon mirror from the obliquely upward direction, a first light emitting portion is defined to correspond to a first scanning line at a head in the sub scanning direction, while among a plurality of light emitting portions of the scanning unit that emit the light beams entering the deflection surface of the rotational polygon mirror from the obliquely downward direction, a second light emitting portion is defined to correspond to a second scanning line at the head in the sub scanning direction; and
   a height of the first light emitting portion in the sub scanning direction on the light source unit is different from a height of the second light emitting portion in the sub scanning direction on the light source unit, so as to reduce a deviation between the first scanning line drawn on the scanned surface and the second scanning line drawn on the scanned surface in the sub scanning direction.

2. A multi-beam light scanning apparatus according to claim 1, wherein the light source unit in each of the plurality of scanning units comprises a monolithic multi-beam semiconductor laser in which the plurality of light emitting portions are disposed on the same substrate, and the intervals between the plurality of light emitting portions disposed on the same substrate are the same.

3. A multi-beam light scanning apparatus according to claim 1, wherein the light source unit in each of the plurality of scanning units includes a beam combination unit which emits the plurality of light beams emitted from the plurality of light emitting portions constituting the light source unit in the same direction.

4. A multi-beam light scanning apparatus comprising a plurality of scanning units each including:
   a light source unit including a plurality of light emitting portions arranged at intervals in a main scanning direction and in a sub scanning direction;
   an incident optical system which allows a plurality of light beams emitted from the plurality of light emitting portions to enter a deflection surface of a rotational polygon mirror; and
   an imaging optical system for condensing a plurality of light beams deflected by the deflection surface of the rotational polygon mirror on a scanned surface; and
   at least one reflection mirror in an optical path between the deflection surface of the rotational polygon mirror and the scanned surface, wherein:
   the deflection surface of the rotational polygon mirror and the scanned surface satisfy a conjugate relationship in a sub scanning section;
   the incident optical system in each of the plurality of scanning units allows a plurality of light beams to enter the deflection surface of the rotational polygon mirror at a finite angle from one of an obliquely upward direction and an obliquely downward direction with respect to a surface perpendicular to a rotation axis of the rotational polygon mirror in the sub scanning section;
   a difference between a first number of folds of the plurality of light beams entering the deflection surface of the rotational polygon mirror from the obliquely upward direction and being reflected by the at least one reflection mirror and a second number of folds of the plurality of light beams entering the deflection surface of the rotational polygon mirror from the obliquely downward direction and being reflected by the at least one reflection mirror is an odd number;

among a plurality of light emitting portions of the scanning unit that emit the light beams entering the deflection surface of the rotational polygon mirror from the obliquely upward direction, a first light emitting portion is defined to correspond to a first scanning line at a head in the sub scanning direction, while among a plurality of light emitting portions of the scanning unit that emit the light beams entering the deflection surface of the rotational polygon mirror from the obliquely downward direction, a second light emitting portion is defined to correspond to a second scanning line at the head in the sub scanning direction; and a height of the first light emitting portion in the sub scanning direction on the light source unit is the same as a height of the second light emitting portion in the sub scanning direction on the light source unit.

5. A multi-beam light scanning apparatus according to claim 4, wherein the light source unit in each of the plurality of scanning units comprises a monolithic multi-beam semiconductor laser in which the plurality of light emitting portions are disposed on the same substrate, and the intervals between the plurality of light emitting portions disposed on the same substrate are the same.

6. A multi-beam light scanning apparatus according to claim 4, wherein the light source unit in each of the plurality of scanning units includes a beam combination unit which emits the plurality of light beams emitted from the plurality of light emitting portions constituting the light source unit in the same direction.

7. A multi-beam light scanning apparatus comprising:
a light source unit including a plurality of light emitting portions arranged at intervals in a main scanning direction and in a sub scanning direction;
an incident optical system which allows a plurality of light beams emitted from the plurality of light emitting portions to enter a deflection surface of a rotational polygon mirror; and
an imaging optical system for condensing a plurality of light beams deflected by the deflection surface of the rotational polygon mirror on a scanned surface; and
at least one reflection mirror in an optical path between the deflection surface of the rotational polygon mirror and the scanned surface, wherein:
the deflection surface of the rotational polygon mirror and the scanned surface satisfy a conjugate relationship in a sub scanning section;
all the incident optical systems in the plurality of scanning units allow a plurality of light beams to enter the deflection surface of the rotational polygon mirror at a finite angle from one of an obliquely upward direction and an obliquely downward direction with respect to a surface perpendicular to a rotation axis of the rotational polygon mirror in the sub scanning section;
a difference between a first number of folds of the light beam deflectively scanned by the deflection surface of the rotational polygon mirror of one scanning unit of the plurality of scanning units being reflected by the at least one reflection mirror and a second number of folds of the plurality of light beams deflectively scanned by the deflection surface of the rotational polygon mirror of another scanning unit of the plurality of scanning units being reflected by the at least one reflection mirror is an even number;
among a plurality of light emitting portions of the one scanning unit, a first light emitting portion is defined to correspond to a first scanning line at a head in the sub scanning direction, while among a plurality of light emitting portions of the another scanning unit, a second light emitting portion is defined to correspond to a second scanning line at the head in the sub scanning direction; and
a height of the first light emitting portion in the sub scanning direction on the light source unit is the same as a height of the second light emitting portion in the sub scanning direction on the light source unit.

8. A multi-beam light scanning apparatus according to claim 7, wherein the light source unit in each of the plurality of scanning units comprises a monolithic multi-beam semiconductor laser in which the plurality of light emitting portions are disposed on the same substrate, and the intervals between the plurality of light emitting portions disposed on the same substrate are the same.

9. A multi-beam light scanning apparatus according to claim 7, wherein the light source unit in each of the plurality of scanning units includes a beam combination unit which emits the plurality of light beams emitted from the plurality of light emitting portions constituting the light source unit in the same direction.

10. A multi-beam light scanning apparatus comprising a plurality of scanning units each including:
a light source unit including a plurality of light emitting portions arranged at intervals in a main scanning direction and in a sub scanning direction;
an incident optical system which allows a plurality of light beams emitted from the plurality of light emitting portions to enter a deflection surface of a rotational polygon mirror; and
an imaging optical system for condensing a plurality of light beams deflected by the deflection surface of the rotational polygon mirror on a scanned surface; and
at least one reflection mirror in an optical path between the deflection surface of the rotational polygon mirror and the scanned surface, wherein:
the deflection surface of the rotational polygon mirror and the scanned surface satisfy a conjugate relationship in a sub scanning section;
all the incident optical systems in the plurality of scanning units allow a plurality of light beams to enter the deflection surface of the rotational polygon mirror at a finite angle from one of an obliquely upward direction and an obliquely downward direction with respect to a surface perpendicular to a rotation axis of the rotational polygon mirror in the sub scanning section;
a difference between a first number of folds of the plurality of light beams deflectively scanned by the deflection surface of the rotational polygon mirror of one scanning unit of the plurality of scanning units being reflected by the at least one reflection mirror and a second number of folds of the plurality of light beams deflectively scanned by the deflection surface of the rotational polygon mirror of another scanning unit of the plurality of scanning units being reflected by the at least one reflection mirror is an odd number;
among the plurality of light emitting portions of the one scanning unit, a first light emitting portion is defined to correspond to a first scanning line at a head in the sub scanning direction, while among a plurality of light emitting portions of the another scanning unit, a second light emitting portion is defined to correspond to a second scanning line at the head in the sub scanning direction; and a height of the first light emitting portion in the sub scanning direction on a light source unit is different from a height of the second light emitting portion in the sub scanning direction on a light source unit.

11. A multi-beam light scanning apparatus according to claim 10, wherein the light source unit in each of the plurality of scanning units comprises a monolithic multi-beam semiconductor laser in which the plurality of light emitting portions are disposed on the same substrate, and the intervals between the plurality of light emitting portions disposed on the same substrate are the same.

12. A multi-beam light scanning apparatus according to claim 10, wherein the light source unit in each of the plurality of scanning units includes a beam combination unit which emits the plurality of light beams emitted from the plurality of light emitting portions constituting the light source unit in the same direction.

13. A light scanning apparatus comprising:
a first light source unit and a second light source unit each including a plurality of light emitting portions arranged at intervals in a main scanning direction and a sub scanning direction;
a first incident optical system which allows a plurality of light beams emitted from the first light source unit to enter a common deflection surface of a deflection unit, and a second incident optical system which allows a plurality of light beams emitted from the second light source unit to enter the common deflection surface of the deflection unit; and
an imaging optical system for condensing the plurality of light beams deflected by the common deflection surface on a first scanned surface and a second scanned surface each of which respectively corresponds to the first incident optical system and the second incident optical system, wherein:
each of the first incident optical system and the second incident optical system allow the plurality of light beams from the first light source unit and the second light source unit to enter the common deflection surface in an oblique direction with respect to a surface perpendicular to a rotation axis of the deflection unit in a sub scanning section; and
when a first light emitting portion, among the plurality of the light emitting portions in the first light source unit, is defined to correspond to a first scanning line at a head in the sub scanning direction on the first scanned surface, and a second light emitting portion, among the plurality of the light emitting portions in the second light source unit, is defined to correspond to a second scanning line at a head in the sub scanning direction on the second scanned surface, the first light emitting portion and the second light emitting portion are selected from the plurality of light emitting portions so as to reduce a deviation between the first scanning line and the second scanning line in the sub scanning direction.

14. A light scanning apparatus comprising:
a first light source unit and a second light source unit each including a plurality of light emitting portions arranged at intervals in a main scanning direction and a sub scanning direction;
a first incident optical system which allows a plurality of light beams emitted from the first light source unit to enter a common deflection surface of a deflection unit, and a second incident optical system which allows a plurality of light beams emitted from the second light source unit to enter the common deflection surface of the deflection unit; and
an imaging optical system for condensing the plurality of light beams deflected by the common deflection surface on a first scanned surface and a second scanned surface each of which respectively corresponds to the first incident optical system and the second incident optical system, wherein:
each of the first incident optical system and the second incident optical system allow the plurality of light beams from the first light source unit and the second light source unit to enter the common deflection surface in an oblique direction with respect to a surface perpendicular to a rotation axis of the deflection unit in a sub scanning section; and
when a first light emitting portion, among the plurality of the light emitting portions in the first light source unit, is defined to correspond to a first scanning line at a head in the sub scanning direction on the first scanned surface, and a second light emitting portion, among the plurality of the light emitting portions in the second light source unit, is defined to correspond to a second scanning line at a head in the sub scanning direction on the second scanned surface, an order of an arrangement of the first light emitting portion in the first light source unit in the main scanning direction is different from an order of an arrangement of the second light emitting portion in the second light source in the main scanning direction.

15. An light scanning apparatus according to claim 14, further comprising at least one reflection mirror in an optical path between the common deflection surface and the first scanned surface and at least one reflection mirror in an optical path between the common deflection surface and the second scanned surface, wherein:
the first incident optical system allows the plurality of light beams to enter the common deflection surface from an obliquely upward direction with respect to the surface perpendicular to the rotation axis of the deflection unit in the sub scanning section, and the second incident optical system allows the plurality of light beams to enter the common deflection surface from an obliquely downward direction with respect to the surface perpendicular to the rotation axis of the deflection unit in the sub scanning section;
a difference between a first number of folds of the light beam emitted from the first light source unit, deflected by the common deflection surface, and reflected by the at least one reflection mirror in the sub scanning section, and a second number of folds of the light beams emitted from the second light source unit, deflected by the common deflection surface, and reflected by the at least one reflection mirror in the sub scanning section, is zero or even numbers; and
an order of an arrangement of the first light emitting portion in the first light source unit in the sub scanning direction is different from an order of an arrangement of the second light emitting portion in the second light source in the sub scanning direction.

16. A light scanning apparatus according to claim 14, further comprising at least one reflection mirror in an optical path between the common deflection surface and the first scanned surface and at least one reflection mirror in an optical path between the common deflection surface and the second scanned surface, wherein:
the first incident optical system allows the plurality of light beams to enter the common deflection surface from an obliquely upward direction with respect to the surface perpendicular to the rotation axis of the deflection unit in the sub scanning section, and the second incident optical system allows the plurality of light beams to enter the common deflection surface from an obliquely downward direction with respect to the surface perpendicular to the rotation axis of the deflection unit in the sub scanning section;

a difference between a first number of folds of the light beam emitted from the first light source unit, deflected by the common deflection surface, and reflected by the at least one reflection mirror in the sub scanning section, and a second number of folds of the light beams emitted from the second light source unit, deflected by the common deflection surface, and reflected by the at least one reflection mirror in the sub scanning section, is odd numbers; and an order of an arrangement of the first light emitting portion in the first light source unit in the sub scanning direction is the same as an order of an arrangement of the second light emitting portion in the second light source in the sub scanning direction.

17. A light scanning apparatus according to claim 14, further comprising at least one reflection mirror in an optical path between the common deflection surface and the first scanned surface and at least one reflection mirror in an optical path between the common deflection surface and the second scanned surface, wherein:

both the first incident optical system and the second incident optical system allow the plurality of light beams to enter the common deflection surface from one of a direction of an obliquely upward direction and an obliquely downward direction with respect to the surface perpendicular to the rotation axis of the deflection unit in the sub scanning section;

a difference between a first number of folds of the light beam emitted from the first light source unit, deflected by the common deflection surface, and reflected by the at least one reflection mirror in the sub scanning section, and a second number of folds of the light beams emitted from the second light source unit, deflected by the common deflection surface, and reflected by the at least one reflection mirror in the sub scanning section, is zero or even numbers; and an order of an arrangement of the first light emitting portion in the first light source unit in the sub scanning direction is the same as an order of an arrangement of the second light emitting portion in the second light source in the sub scanning direction.

18. A light scanning apparatus according to claim 14, further comprising at least one reflection mirror in an optical path between the common deflection surface and the first scanned surface and at least one reflection mirror in an optical path between the common deflection surface and the second scanned surface, wherein:

both the first incident optical system and the second incident optical system allow the plurality of light beams to enter the common deflection surface from one of a direction of an obliquely upward direction and an obliquely downward direction with respect to the surface perpendicular to the rotation axis of the deflection unit in the sub scanning section;

a difference between a first number of folds of the light beam emitted from the first light source unit, deflected by the common deflection surface, and reflected by the at least one reflection mirror in the sub scanning section, and a second number of folds of the light beams emitted from the second light source unit, deflected by the common deflection surface, and reflected by the at least one reflection mirror in the sub scanning section, is odd numbers; and an order of an arrangement of the first light emitting portion in the first light source unit in the sub scanning direction is different from an order of an arrangement of the second light emitting portion in the second light source in the sub scanning direction.

19. A light scanning apparatus according to claim 14, wherein each of the first light source unit and the second light source unit comprises a monolithic multi-beam semiconductor laser in which the plurality of light emitting portions are disposed on the same substrate, and the interval between the plurality of light emitting portions disposed on the same substrate are the same in the main scanning direction and the sub scanning direction.

20. A light scanning apparatus according to claim 14, wherein each of the first light source unit and the second light source unit includes a beam combination unit which emits the plurality of light beams emitted from the plurality of light emitting portions in the same direction.

21. An image forming apparatus comprising:
a light scanning apparatus including:
a first light source unit and a second light source unit each including a plurality of light emitting portions arranged at intervals in a main scanning direction and a sub scanning direction;
a first incident optical system which allows a plurality of light beams emitted from the first light source unit to enter a common deflection surface of a deflection unit, and a second incident optical system which allows a plurality of light beams emitted from the second light source unit to enter the common deflection surface of the deflection unit; and
an imaging optical system for condensing the plurality of light beams deflected by the common deflection surface on a first scanned surface and a second scanned surface each of which respectively corresponds to the first incident optical system and the second incident optical system,
wherein:
each of the first incident optical system and the second incident optical system allow the plurality of light beams from the first light source unit and the second light source unit to enter the common deflection surface in an oblique direction with respect to a surface perpendicular to a rotation axis of the deflection unit in a sub scanning section; and
when a first light emitting portion, among the plurality of the light emitting portions in the first light source unit, is defined to correspond to a first scanning line at a head in the sub scanning direction on the first scanned surface, and a second light emitting portion, among the plurality of the light emitting portions in the second light source unit, is defined to correspond to a second scanning line at a head in the sub scanning direction on the second scanned surface, an order of an arrangement of the first light emitting portion in the first light source unit in the main scanning direction is different from an order of an arrangement of the second light emitting portion in the second light source in the main scanning direction; and
a first image carrier and a second image carrier which are disposed on the first scanned surface and the second scanned surface respectively, and form images of different colors.

* * * * *